(12) United States Patent
Ito et al.

(10) Patent No.: US 10,164,248 B2
(45) Date of Patent: Dec. 25, 2018

(54) NEGATIVE ELECTRODE ACTIVE MATERIAL COMPRISING SILICON AND AT LEAST ONE METAL ELEMENT, AND BATTERY, BATTERY PACK, ELECTRONIC APPARATUS, ELECTRIC VEHICLE, ELECTRICAL STORAGE APPARATUS AND ELECTRICITY SYSTEM USING SAME

(71) Applicant: Sony Corporation, Tokyo (JP)

(72) Inventors: Daisuke Ito, Kanagawa (JP); Syuuiti Takizawa, Tokyo (JP); Kazutaka Habu, Tokyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 52 days.

(21) Appl. No.: 14/617,180

(22) Filed: Feb. 9, 2015

(65) Prior Publication Data
US 2015/0243972 A1    Aug. 27, 2015

(30) Foreign Application Priority Data
Feb. 27, 2014    (JP) .................................. 2014-037051

(51) Int. Cl.
*H01M 4/13*    (2010.01)
*H01M 4/36*    (2006.01)
(Continued)

(52) U.S. Cl.
CPC .............. *H01M 4/366* (2013.01); *B60L 1/06* (2013.01); *B60L 3/0046* (2013.01); *B60L 3/04* (2013.01);
(Continued)

(58) Field of Classification Search
CPC ...... H01M 4/362; H01M 4/364; H01M 4/366; H01M 4/386; H01M 4/0402;
(Continued)

(56) References Cited

U.S. PATENT DOCUMENTS

| 3,659,917 | A  | * | 5/1972 | Boutineau | ............. | G02F 1/0305 |
| | | | | | | 359/245 |
| 6,902,845 | B2 | * | 6/2005 | Tani | .................... | H01M 4/0416 |
| | | | | | | 429/218.1 |

(Continued)

FOREIGN PATENT DOCUMENTS

| CN | 1419716 | 5/2003 |
| JP | 2001-076719 A | 3/2001 |

(Continued)

OTHER PUBLICATIONS

Japanese Office Action dated Nov. 8, 2016 in corresponding Japanese application No. 2014-037051 (8 pages).
(Continued)

*Primary Examiner* — Raymond Alejandro
(74) *Attorney, Agent, or Firm* — K&L Gates LLP

(57) ABSTRACT

A negative electrode active material includes a core particle comprising silicon; and at least one metal element selected from the group consisting of: Ge, Sn, Ni, Mo, W, Ag, Pd, Cu, Bi, Fe, Co, Mn, Cr, V, Ga, B, Sb, In, Te, Cd, Rh, Ru, Nb, Ta, Re, Os, Ir, Pt, Pb and P. The negative electrode active material has an elemental composition that varies continuously from a center of the core particle to a surface of the core particle. A negative electrode, a battery, an electric vehicle, an electric storage apparatus, an electronic apparatus and a power storage system each include the negative electrode active material.

15 Claims, 18 Drawing Sheets

(51) Int. Cl.
　　　H01M 4/134　　　(2010.01)
　　　H01M 4/38　　　(2006.01)
　　　H01M 4/04　　　(2006.01)
　　　H01M 4/1395　　(2010.01)
　　　B60L 11/18　　　(2006.01)
　　　B60L 1/06　　　(2006.01)
　　　B60L 3/00　　　(2006.01)
　　　B60L 3/04　　　(2006.01)
　　　B60L 3/12　　　(2006.01)
　　　B60L 8/00　　　(2006.01)
　　　B60L 11/14　　　(2006.01)
　　　H01M 4/02　　　(2006.01)

(52) U.S. Cl.
　　　CPC ............... *B60L 3/12* (2013.01); *B60L 8/003* (2013.01); *B60L 11/14* (2013.01); *B60L 11/1816* (2013.01); *B60L 11/1824* (2013.01); *B60L 11/1846* (2013.01); *B60L 11/1859* (2013.01); *B60L 11/1861* (2013.01); *B60L 11/1864* (2013.01); *B60L 11/1879* (2013.01); *H01M 4/0402* (2013.01); *H01M 4/0471* (2013.01); *H01M 4/134* (2013.01); *H01M 4/1395* (2013.01); *H01M 4/38* (2013.01); *H01M 4/386* (2013.01); *B60L 2210/40* (2013.01); *B60L 2220/12* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60L 2240/547* (2013.01); *B60L 2240/549* (2013.01); *B60L 2250/16* (2013.01); *B60L 2270/145* (2013.01); *H01M 2004/027* (2013.01); *H01M 2220/10* (2013.01); *H01M 2220/20* (2013.01); *Y02T 10/642* (2013.01); *Y02T 10/70* (2013.01); *Y02T 10/7005* (2013.01); *Y02T 10/7044* (2013.01); *Y02T 10/7061* (2013.01); *Y02T 10/7072* (2013.01); *Y02T 10/7077* (2013.01); *Y02T 10/7083* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
　　　CPC .. H01M 4/0471; H01M 4/0404; H01M 4/134; H01M 4/1395; H01M 4/38; H01M 10/05; H01M 10/052; H01M 2004/027; H01M 2220/10; Y02E 60/122
　　　See application file for complete search history.

(56) References Cited

U.S. PATENT DOCUMENTS

| 2004/0232840 | A1* | 11/2004 | Aoki ............... H01J 9/02 313/582 |
| 2007/0062719 | A1* | 3/2007 | Shibata ........... C04B 35/565 174/110 R |
| 2011/0076565 | A1 | 3/2011 | Cho et al. |

FOREIGN PATENT DOCUMENTS

| JP | 2001-273892 A | 10/2001 |
| JP | 2006-185716 A | 7/2006 |
| JP | 2007-305424 | 11/2007 |
| JP | 2011-076985 A | 4/2011 |
| JP | 2011-086599 A | 4/2011 |
| JP | 2011-187287 A | 9/2011 |
| JP | 2013-041756 A | 2/2013 |

OTHER PUBLICATIONS

Chinese Office Action dated Jul. 6, 2018 in corresponding Chinese Application No. 201510080171.4.

* cited by examiner

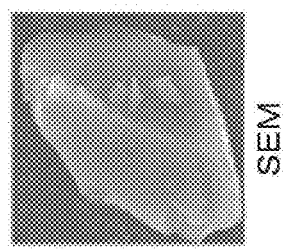
FIG.8A SEM
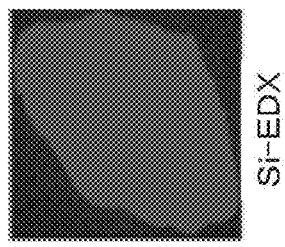
FIG.8B Si-EDX
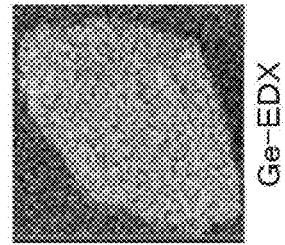
FIG.8C Ge-EDX

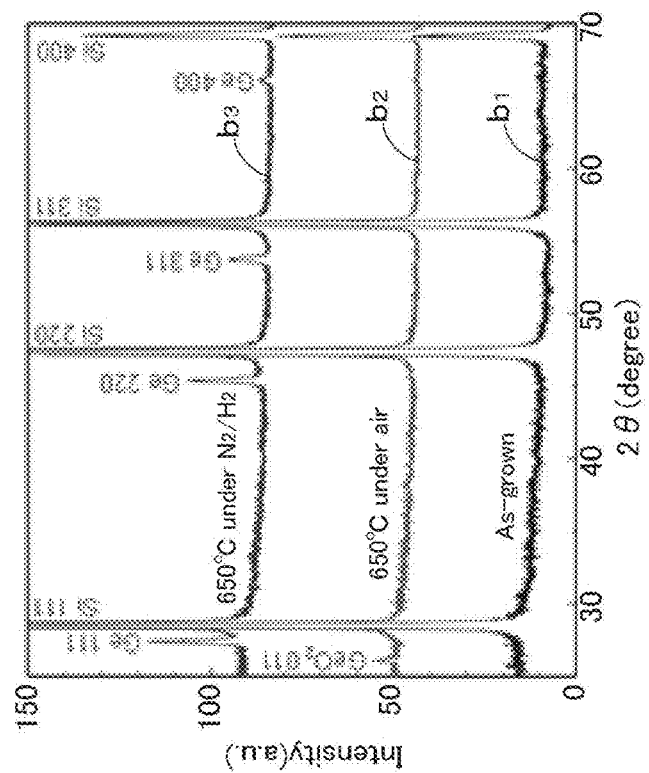
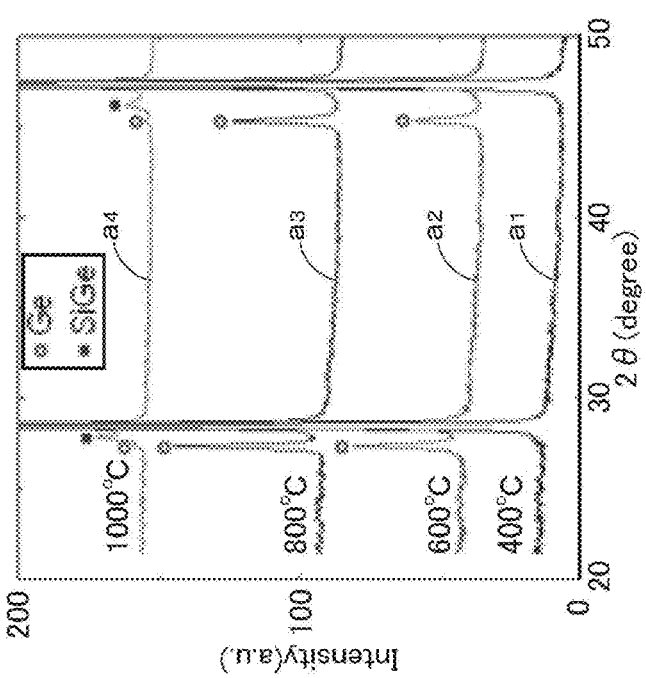
FIG.9A
FIG.9B

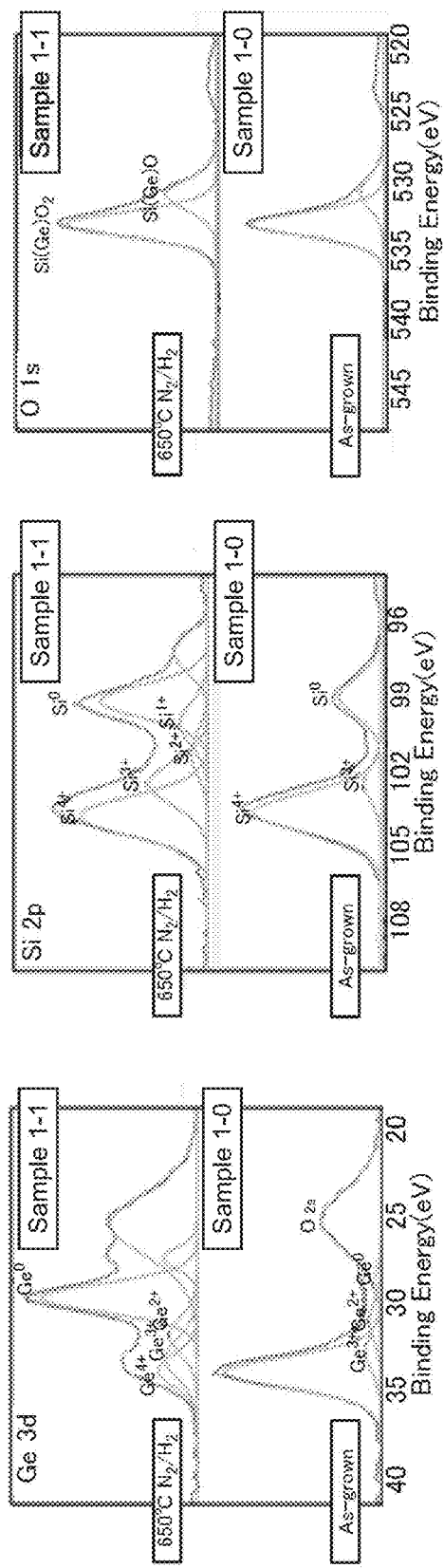

NEGATIVE ELECTRODE ACTIVE MATERIAL COMPRISING SILICON AND AT LEAST ONE METAL ELEMENT, AND BATTERY, BATTERY PACK, ELECTRONIC APPARATUS, ELECTRIC VEHICLE, ELECTRICAL STORAGE APPARATUS AND ELECTRICITY SYSTEM USING SAME

CROSS REFERENCES TO RELATED APPLICATIONS

The present application claims priority to Japanese Priority Patent Application JP 2014-037051 filed in the Japan Patent Office on Feb. 27, 2014, the entire content of which is hereby incorporated by reference.

BACKGROUND

The present disclosure relates to a negative electrode active material, a battery, a battery pack, an electronic apparatus, an electric vehicle, an electrical storage apparatus and an electricity system.

Recently, greater capacity and faster charging-discharging speed of lithium-ion secondary batteries are strongly demanded. For a purpose of realizing greater capacity than that with the use of a carbon material, the uses of Si (silicon) and the like for negative electrode active materials have been studied. However, so far, it may have a problem using Si and the like, in terms of cycle characteristics and rapid charge-discharge.

In view of such circumstances, techniques of modifying material properties of a commercially available Si active material with easy processing have been studied.

For example, a technique of modifying Si material properties by surface-coating of the Si is under study. It is reported that alumina, and SiO, are effective in improving cycle characteristics. SiO coating is likely to be especially effective, but regarding SiO coating, because of instability of SiO, it seems that so far there is no good method other than vapor phase coating by using CVD (Chemical Vapor Deposition) and the like. However, the cost to install equipment for this method would be large, and in addition, it is not easy to fully-coat the surface of a Si particle since the method is a vapor phase method. Meanwhile, for example, Japanese Patent Application Laid-open No. 2007-305424 suggests a technique of adding a different element to a Si material.

SUMMARY

In view of the circumstances as described above, it is thus desirable to provide a negative electrode active material that can improve active material properties of a Si material; and, a battery, a battery pack, an electronic apparatus, an electric vehicle, an electrical storage apparatus and an electricity system using the negative electrode active material.

According to one embodiment, the present disclosure provides a negative electrode active material comprising: a core particle comprising silicon; and at least one metal element selected from the group consisting of: Ge, Sn, Ni, Mo, W, Ag, Pd, Cu, Bi, Fe, Co, Mn, Cr, V, Ga, B, Sb, In, Te, Cd, Rh, Ru, Nb, Ta, Re, Os, Ir, Pt, Pb and P. An elemental composition of the negative electrode active material varies continuously from a center of the core particle to a surface of the core particle.

According to one embodiment, the present disclosure provides a negative electrode active material comprising: a core particle comprising silicon; and a coating comprising at least one metal element selected from the group consisting of: Ge, Sn, Ni, Mo, W, Ag, Pd, Cu, Bi, Fe, Co, Mn, Cr, V, Ga, B, Sb, In, Te, Cd, Rh, Ru, Nb, Ta, Re, Os, Ir, Pt, Pb and P. At least a part of the core particle forms a silicon oxide.

According to one embodiment, the present disclosure provides a negative electrode, a battery, an electric vehicle, an electric storage apparatus, an electronic apparatus and a power storage system, each of the embodiments including a negative electrode active material according to any of the embodiments described above.

According to one embodiment, the present disclosure provides a method of manufacturing a negative electrode active material comprising: forming a coating on at least a part of a surface of a core particle comprising silicon; and reducing the coating by performing a heat treatment. The coating comprises at least one of a metal oxide and a metal hydroxide comprising at least one metal element selected from the group consisting of: Ge, Sn, Ni, Mo, W., Ag, Pd, Cu, Bi, Fe, Co, Mn, Cr, V, Ga, B, Sb, In, Te, Cd, Rh, Ru, Nb, Ta, Re, Os, Or, Pt, Pb and P.

By the present disclosure, it is possible to improve active material properties of a Si material.

These and other objects, features and advantages of the present disclosure will become more apparent in light of the following detailed description of best mode embodiment thereof, as illustrated in the accompanying drawings.

Additional features and advantages are described herein, and will be apparent from the following Detailed Description and the figures.

BRIEF DESCRIPTION OF THE FIGURES

FIG. 8A shows a SEM image of Sample 1-0;

FIG. 8B shows an elemental mapping image of Sample 1-0;

FIG. 8C shows another elemental mapping image of Sample 1-0;

FIG. 9A shows XRD patterns of Samples 1-2 to 1-5;

FIG. 9B shows XRD patterns of Samples 1-0, 1-1 and 1-6;

FIG. 10A shows Ge 3d5/2 spectra of Samples 1-0 and 1-1;

FIG. 10B shows Si 2p spectra of Samples 1-0 and 1-1;

FIG. 10C shows O 1s spectra of Samples 1-0 and 1-1;

DETAILED DESCRIPTION

Hereinafter, embodiments of the present disclosure will be described with reference to the drawings. The descriptions will be made in the following order.

1. First embodiment (example of negative electrode active material)
2. Second embodiment (example of battery)
3. Third embodiment (example of battery pack)
4. Fourth embodiment (example of power storage system, etc.)
5. Other embodiments (variation examples)

It should be noted that the following embodiments and the like are concrete examples of favorable embodiments of the present disclosure, and the content of the present disclosure should not be construed as limited to these embodiments and the like. In addition, the effects described herein are non-limitative examples, and it should not be construed as denying the presence of other effects that are different from the illustrated effects.

1. First Embodiment (Negative Electrode Active Material)

A negative electrode active material of a first embodiment of the present disclosure will be described. The negative electrode active material is obtained from forming a thin film (coating) on at least a part of a surface of a core particle containing Si; followed by reducing the thin film (coating) by reducing heat treatment using Ellingham diagram. The core particle is a Si particle or a $SiO_a$ particle (where "a" represents the elemental ratio, which is $0<a<2$) (hereinafter referred to as Si oxide particle). As used herein, the term "metal" includes also semimetals.

Formation of the coating may be made by, for example, sol-gel hydrolysis process and the like. The sol-gel hydrolysis process would be favorable because it can allow complicated shapes of Si particles and Si oxide particles to be coated. Typical examples of the coating include metal oxides. Examples of the metal oxides include an oxide including at least one metal element selected from the group consisting of Ge, Sn, Ni, Mo, W, Ag, Pd, Cu, Bi, Fe, Co, Mn, Cr, V, Ga, B, Sb, In, Te, Cd, Rh, Ru, Nb, Ta, Re, Os, Ir, Pt, Pb and P. For example, by putting a Si powder into a solution, the solution being prepared by dissolving a metal alkoxide in a solvent such as alcohol; and drying; the thin film made of the metal oxide may be formed on the Si particle or Si oxide particle as the core particle. Note that the coating may include a metal hydroxide in the place of the metal oxide, and may include both metal oxides and metal hydroxides. Examples of the metal hydroxides include an oxide including at least one metal element selected from the group consisting of Ge, Sn, Ni, Mo, W, Ag, Pd, Cu, Bi, Fe, Co, Mn, Cr, V, Ga, B, Sb, In, Te, Cd, Rh, Ru, Nb, Ta, Re, Os, Ir, Pt, Pb and P.

Figure 1:
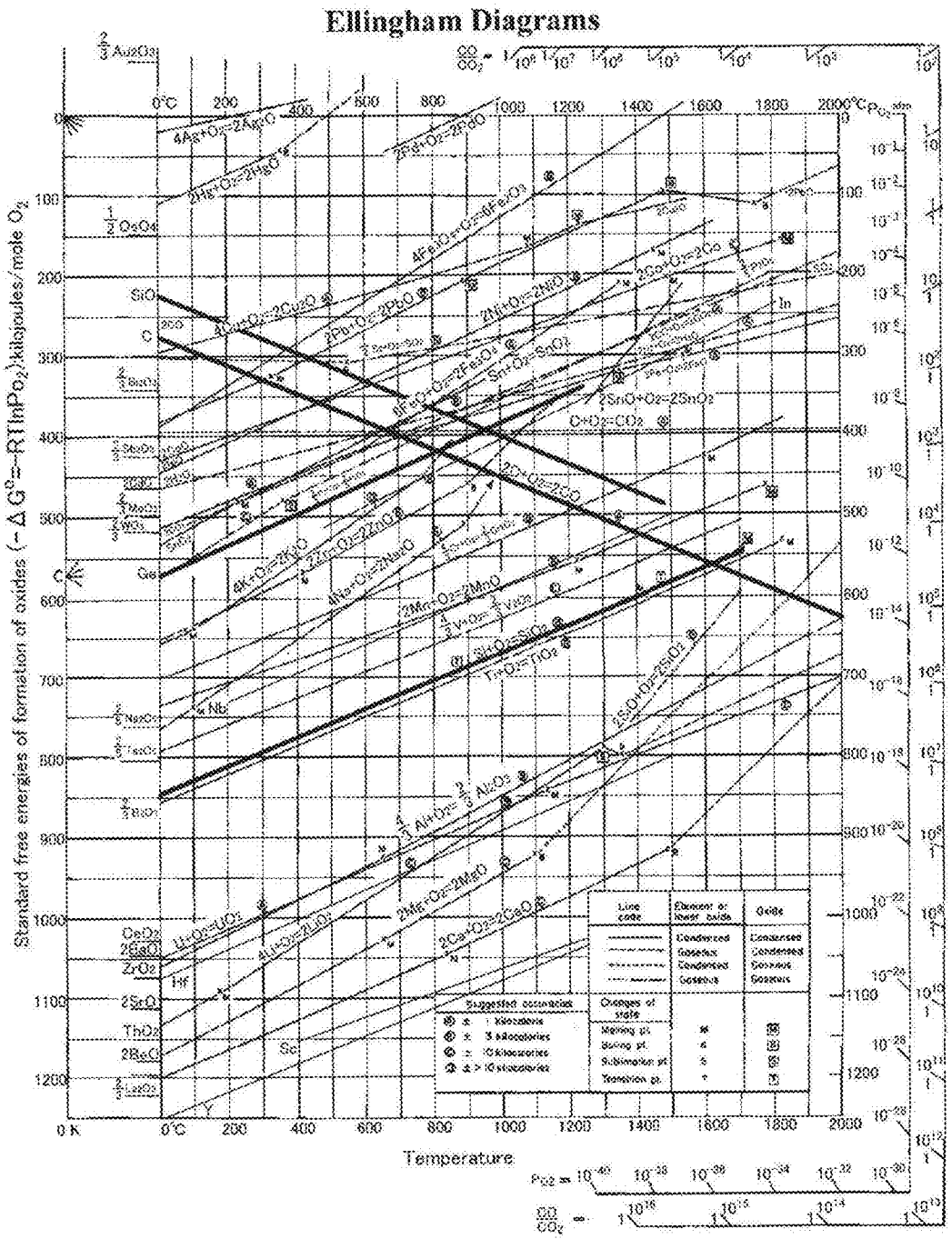
FIG. 1 is a graph showing Ellingham diagram.

Herein, the "Ellingham diagram" is a relationship diagram between temperature and each element's Gibbs free energy of formation with respect to oxygen molecules (1 mol) (standard free energy of formation of an oxide of the corresponding element; hereinafter sometimes referred to as "$\Delta G$"). FIG. 1 shows the Ellingham diagram. A graph shown in FIG. 1 indicates the changes in $\Delta G$ of each element with respect to oxygen molecules (1 mol), against temperature.

According to the Ellingham diagram, a smaller $\Delta G$ makes the element more easily oxidized. In the reducing heat treatment, it may reduce the metal oxide of the coating with an element having smaller $\Delta G$ with respect to oxygen molecules (1 mol) than $\Delta G$ of the metal element with respect to oxygen molecules (1 mol) according to the Ellingham diagram, so that the metal oxide of the coating is reduced to a metal or a metal oxide having a smaller oxidation number. (For example, $MO_x \rightarrow M$; or $MO_x \rightarrow MO_y$; where M is a metal element, "x" and "y" represent the compositional ratio of oxygen, and $x>y$.)

Example of reductants that can reduce the metal oxide thin film as the coating include Si or Si oxide ($SiO_a$) of the core particle, C (carbon) contained in a precursor of the coating (e.g., metal alkoxide), and the like. In addition, $H_2$ in the atmosphere of the reducing heat treatment may also function as the reductant.

Favorable temperature conditions for the reducing heat treatment may be those in which the metal element in the coating can have smaller $\Delta G$ with respect to oxygen molecules (1 mol) than $\Delta G$ of the element or compound in the core particle (i.e., Si or Si oxide) with respect to oxygen molecules (1 mol) and also smaller than $\Delta G$ of C with respect to oxygen molecules (1 mol). Typical examples of the atmosphere under which the reducing heat treatment is performed include an atmosphere of nitrogen, argon, hydrogen, or their mixed gas (mixed gas including at least two of nitrogen, argon and hydrogen).

In the reducing heat treatment, by Si, Si oxide, C and the like, the metal oxide would be reduced to form the reduced product of the metal oxide. As a result, the negative electrode active material including the core particle and the reduced product of the metal oxide of the coating can be obtained.

The negative electrode active material obtainable in such a way can have various types of configurations, by changing the conditions for the reducing heat treatment (temperature conditions, atmosphere conditions, etc.), metal species of the metal oxides or metal hydroxides of the coating, and the like. In the following, first to third configuration examples of the negative electrode active material will be described.

(First to Third Configuration Examples of Negative Electrode Active Material)

(First Configuration Example of Negative Electrode Active Material)

A first configuration example of the negative electrode active material will be described. The following first configuration example is illustrated as a case in which the core particle containing Si is a Si particle and the coating is a metal oxide. Note that, alternatively, the core particle containing Si may be a Si oxide particle; and the coating may be a metal hydroxide or one including both a metal oxide and a metal hydroxide (same applies to second and third configuration examples).

In cases where the temperature for the reducing heat treatment according to the Ellingham diagram is relatively low, the metal oxide as the coating would be reduced with, for example, Si and C, and the like. As a result, the coating turns into a reduced product of the metal oxide, while a part of the core particle forms a Si oxide due to oxidation of Si. This Si oxide may be formed in, for example, the vicinity of a joint interface of the core particle and the coating.

The temperature conditions depend on the metal element species of the metal oxide, and may desirably be a temperature range where interdiffusion between the metal element and the Si is not likely to occur. To give some concrete examples, in cases where Ni is used, a temperature under 400° C. may be desirable. In cases where Ge is used, for example, a temperature under 600° C. may be desirable. In these cases, the negative electrode active material formed by the reducing heat treatment may have a structure of, for example, a multi-layer structure in which the layers vary from the center of the particle to the surface in the order of: Si layer; Si oxide layer; layer of the reduced product of the metal oxide. Note that the reduced product of the metal oxide is, for example, a metal or a metal oxide having a smaller oxidation number than that of the metal oxide before reduction.

A desirable metal or metal oxide used for coating may be Ge or Ge oxide. Since Ge has 10000 times higher conductivity than that of Si and 400 times higher lithium diffusivity than that of Si, and can follow expansion and contraction of Si in the same manner as that of Si for forming an alloy of $GeLi_x$ (x<4.4), Ge may be a material that can cover much of the shortcomings of Si as a negative electrode material. As with Ge, Ge oxides are materials having good properties as well.

(Case of First Configuration Example of Negative Electrode Active Material)

As one case of the first configuration example of the negative electrode active material, a case in which the reduced product of the metal oxide is Ge or Ge oxide will be illustrated. In this case, for example, by sol-gel hydrolysis process and the like, a Ge oxide thin film is formed on a Si particle as the core particle; followed by reducing the Ge oxide thin film by the reducing heat treatment using Ellingham diagram (e.g., $GeO_x \rightarrow Ge$; or $GeO_x \rightarrow GeO_y$; where "x" and "y" represent the compositional ratio of oxygen, and x>y); and thus the negative electrode active material can be obtained.

In the reducing heat treatment, it may reduce the Ge oxide thin film with an element having smaller $\Delta G$ with respect to oxygen molecules (1 mol) than $\Delta G$ of Ge with respect to oxygen molecules (1 mol) according to the Ellingham diagram, so that the Ge oxide thin film is reduced to Ge. (For example, $GeO_x \rightarrow Ge$; or $GeO_x \rightarrow GeO_y$; where "x" and "y" represent the compositional ratio of oxygen, and x>y.)

Example of reductants that can reduce the Ge oxide thin film include Si of the core particle, C (carbon) contained in an organic Ge compound as a precursor of the coating (e.g., Ge alkoxide such as Ge propoxide, etc.), and the like. In addition, $H_2$ in the atmosphere of the reducing heat treatment may also function as the reductant.

Favorable temperature conditions for the reducing heat treatment may be those in which $\Delta G$ of Ge with respect to oxygen molecules (1 mol) is smaller than $\Delta G$ of Si with respect to oxygen molecules (1 mol) and also smaller than $\Delta G$ of C with respect to oxygen molecules (1 mol). Further, in order to obtain the negative electrode active material of this case of the first configuration example, a typical example of an upper limit of the temperature conditions for the reducing heat treatment is a temperature range where interdiffusion between the Ge and the Si is not likely to occur, which may desirably be a temperature under 800° C.

In the reducing heat treatment, the Ge oxide would be reduced with Si and C to form a reduced product of the Ge oxide, while a part of the core particle forms a Si oxide due to oxidation of Si. For example, the Si oxide may be formed in the vicinity of a joint interface of the core particle and the coating. The negative electrode active material obtained by the reducing heat treatment may be one having the Si particle as the core particle and the reduced product of the Ge oxide coated on the Si particle, for example; and may have a multi-layer structure in which the layers vary from the center of the particle to the surface in the order of: Si layer; Si oxide layer (e.g., $SiO_z$; where "z" represent the compositional ratio of oxygen); layer of the reduced product of the Ge oxide (e.g., at least one of Ge and $GeO_y$).

(Second Configuration Example of Negative Electrode Active Material)

A second configuration example of the negative electrode active material has the Si as the core particle and the metal element as the reduced product of the coating, the Si and the metal element having undergone interdiffusion with each other by the reducing heat treatment under relatively high temperature conditions; in which clear boundaries between the coating and the core particle have disappeared. This second configuration example of the negative electrode active material has a compositional gradient structure having elemental composition varying in a continuous fashion from the center of the core particle to the surface of the core particle. The temperature conditions depend on the metal element species of the metal oxide, and may desirably be a temperature range where interdiffusion between the metal element and the Si can occur, for example. To give some concrete examples, in cases where Ni is used, a temperature higher than or equal to 400° C. may be desirable. In cases where Ge is used, for example, a temperature higher than or equal to 1000° C. may be desirable.

In the reducing heat treatment according to the Ellingham diagram, the metal oxide as the coating would be reduced into a metal with, for example, Si and C, and the like, while interdiffusion of the metal and the Si as the core particle occurs. The second configuration example of the negative electrode active material obtained in this way may have a structure of, for example, a compositional gradient structure having elemental composition varying in a continuous fashion from the center of the core particle (Si particle) to the surface of the core particle in the order of: a region containing Si; a region containing Si and a metal element; a region containing the metal element. Alternatively, this may be in the order of: a region containing Si; a region containing Si and the metal element. Note that the second configuration example of the negative electrode active material may have a compositional gradient structure which only has a region containing Si and the metal element, having elemental composition varying in a continuous fashion from the center of the core particle to the surface of the core particle as well. In a part between the region containing Si and the region containing Si and the metal element; a part between the region containing Si and the metal element and the region containing the metal element; and, within the region containing Si and the metal element, the elemental composition varies in a continuous fashion in which a compositional ratio of the Si is gradually decreased from the center to the surface; and a compositional ratio of the metal element is gradually increased from the center to the surface. In the second configuration example of the negative electrode active material, since the parts between the region containing Si, the region containing Si and the metal element, and the region containing the metal element have a gradation of composition, the structure thereof is one without clear boundaries.

While depending on the metal element species, the interdiffusion of the metal element and Si may be occurring in only the vicinity of a joint interface of the core particle and the coating, or alternatively, may have the metal element being diffused from the surface of the core particle into a deeper position (that is, entire part of the core particle) by solid phase diffusion. Note that, for example, a metal element having a higher diffusion coefficient in Si tends to diffuse into deeper positions.

Some of the metal elements, depending on their kinds, may diffuse by solid phase diffusion into a relatively deep position from the surface of the Si as the core particle. Examples of such metal elements include Ni; which has an atomic radius smaller than that of Si. In contrast, an element such as Ge, having an atomic radius greater than that of Si, is not likely to diffuse into such a deep position from the surface of the Si, in cases where the Si is doped with the element alone.

A content of the metal element is typically, for example, greater than 0 atomic percent and smaller than 1 atomic percent of Si; greater than 0 atomic percent and smaller than 0.5 atomic percent of Si; or greater than 0 atomic percent and smaller than 0.1 atomic percent of Si. By adding a slight amount of metal element to Si, it is possible to improve the properties such as conductivity of the negative electrode active material. If the conductivity of the Si can be improved, it makes it possible to improve the electron transporting property and enable rapid charge-discharge.

In the negative electrode active material having such a compositional gradient structure, clear boundaries between the coating and the core particle have disappeared. That is, between a Si rich region at the center side and a metal-element rich region at the surface side of the negative electrode active material, the core particle and the reduced product of the coating are made as one part in a state without clear boundaries. This is favorable because peeling of the reduced product of the coating is less likely to occur. Note that, for example, in the region containing the Si and the metal element, the Si and the metal element may bond with each other.

In the reducing heat treatment for the second configuration example of the negative electrode active material, by heating under specific conditions, the interdiffusion of the metal element as the reduced product of the coating and Si has occurred, and the hetero interface of the metal-element rich region and the Si rich region has disappeared. As a result, peeling of the reduced product of the coating from the core particle is less likely to occur. For example, in lithium-ion secondary batteries, a situation that the coating would come off due to expansion and contraction of Si may be possible. However, the second configuration is able to retain the coating; and this may lead to improvement of cycle characteristics.

(Case of Second Configuration Example of Negative Electrode Active Material)

As in the first configuration example, Ge is desirable as the metal species of the metal compound of the coating. Since Ge has higher electron conductivity than that of Si and higher lithium diffusivity than that of Si, it is possible to improve the lithium transporting efficiency by adding Ge to Si, and improve the properties of the Si, such as, enabling rapid charge-discharge. In the following, a case of the second configuration example of the negative electrode, being formed with the use of a Ge oxide as the coating will be described.

One case of the second configuration example of the negative electrode is obtained by forming a Ge oxide thin film on a Si particle as the core particle, by sol-gel hydrolysis process and the like; followed by reducing the Ge oxide thin film by the reducing heat treatment using Ellingham diagram ($GeO_x$->Ge). Further, in this negative electrode, Si and Ge have undergone interdiffusion with each other by the reducing heat treatment being performed at relatively high temperature. Note that the temperature conditions for the reducing heat treatment may desirably be a temperature range where interdiffusion between the Ge and the Si occurs. For example, a temperature higher than or equal to 1000° C. may be desirable.

For example, in this case of the second configuration example of the negative electrode, the interdiffusion of Si as the core particle and Ge as the reduced product of the coating has occurred; and it has a compositional gradient structure having elemental composition varying in a continuous fashion from the center to the surface of the particle. Specifically, for example, the elemental composition varies in a continuous fashion in which a compositional ratio of Si is gradually decreased and that of Ge is gradually increased, from the center of the core particle (Si particle) to the surface of the core particle, in the order of: a region containing Si; a region containing Si and Ge; a region containing Ge. In this case of the second configuration example, between a Si rich region at the center side and a Ge rich region at the surface side of the negative electrode active material, the elemental composition varies in a continuous fashion, and the core particle and the reduced product of the coating are made as one part in a state without clear boundaries. Note that, for example, in the region containing the Si and the Ge, the Si and the Ge may bond with each other.

Further, a desirable metal used for coating may be Ni or Co. Ni and Co are elements which go well together with Si and have long diffusion lengths in Si, which also have good compatibility with Si. In addition, as represented by $NiSi_2$, which is called a "salicide" (self-aligned silicide); Ni goes well together with Si and has a relatively high diffusion coefficient in Si. Incidentally, $NiSi_x$ and $CoSi_x$ have very high conductivity, and they are used as electrode materials which can be alloyed by solid-phase diffusion, in the semiconductor field.

(Another Case of Second Configuration Example of Negative Electrode Active Material)

As an example of other cases of the second configuration example, a negative electrode active material formed with the use of a Ni oxide as the coating will be described. This case of the second configuration example is one obtained by forming a Ni oxide thin film on a Si particle as the core particle, by sol-gel hydrolysis process and the like; followed by reducing the Ni oxide thin film by the reducing heat treatment using Ellingham diagram ($NiO_x$->Ni). Further, in this case, Ni as the reduced product of the coating and Si have undergone interdiffusion with each other by the reducing heat treatment. The temperature conditions for the reducing heat treatment may desirably be a temperature higher than or equal to 800° C. As Ni has a relatively high diffusion coefficient in Si, it is possible to diffuse Ni by solid-phase diffusion into a relatively deep position from the surface of the Si particle. In addition, Ni may be desirable also because of its property that it diffuses during the reducing heat treatment and is not likely to diffuse in room temperature.

In this case of the second configuration example of the negative electrode, Ni as the reduced product of the coating has been diffused by solid-phase diffusion into Si as the core particle; and the negative electrode active material has a compositional gradient structure having elemental composition varying in a continuous fashion from the center to the surface of the particle. Specifically, the elemental composition varies in a continuous fashion in which a compositional ratio of Si is gradually decreased and that of Ni is gradually increased, from the center of the core particle to the surface of the core particle, in the order of: a region containing Si; a region containing Si and Ni; a region containing Ni. In this case of the second configuration example, between a Si rich region at the center side and a Ni rich region at the surface side of the negative electrode active material, the elemental composition varies in a continuous fashion, and the core particle and the reduced product of the coating are made as one part in a state without clear boundaries. Note that, for example, in the region containing the Si and the Ni, the Si and the Ni may bond with each other.

(Third Configuration Example of Negative Electrode Active Material)

In order to diffuse the metal element from the surface of the core particle into a deeper position thereof, it is desirable to diffuse the following metal elements at the same time by solid-phase diffusion into Si: a metal element having an atomic radius at least 9 percent greater than that of Si (i.e., metal element having an atomic radius of 109 percent or more of that of Si; hereinafter referred to as "second metal element"); and a metal element having an atomic radius smaller than 109 percent of that of Si (hereinafter referred to as "third metal element"). Among the metal elements (Ge, Sn, Ni, Mo, W, Ag, Pd, Cu, Bi, Fe, Co, Mn, Cr, V, Ga, B, Sb, In, Te, Cd, Rh, Ru, Nb, Ta, Re, Os, Ir, Pt, Pb and P), the metal elements classified as the second metal element are Ge, Sn, Mo, W, Ag, Pd, Bi, V, Ga, Sb, In, Te, Cd, Rh, Ru, Nb, Ta, Re, Os, Ir, Pt and Pb. The metal elements classified as the third metal element are Ni, Cu, Fe, Co, Mn, Cr, B and P.

Note that these second and third metal elements are classified according to the values of their atomic radii which are listed as follows:

Si (1.11 Å), Ge (1.22 Å), Sn (1.40 Å), Ni (1.15 Å), Mo (1.30 Å), W (1.30 Å), Ag (1.34 Å), Pd (1.28 Å), Cu (1.17 Å), Bi (1.46 Å), Fe (1.17 Å), Co (1.16 Å), Mn (1.17 Å), Cr (1.18 Å), V (1.22 Å), Ga (1.26 Å), B (0.82 Å), Sb (1.40 Å), In (1.44 Å), Te (1.36 Å), Cd (1.48 Å), Rh (1.25 Å), Ru (1.25 Å), Nb (1.34 Å), Ta (1.34 Å), Re (1.28 Å), Os (1.26 Å), Ir (1.27 Å), Pt (1.30 Å), Pb (1.47 Å), P (1.06 Å)

In the following, a third configuration example in which the second metal element and the third metal element as the reduced product of the coating have been diffused at the same time by solid-phase diffusion. The third configuration example of the negative electrode active material has the second and third metal elements having undergone solid-phase diffusion at the same time, to be diffused from the surface of the Si particle as the core particle into its deeper position; with the reducing heat treatment according to Ellingham diagram under relatively high temperature conditions. Further, this third configuration example of the negative electrode active material has a compositional gradient structure having elemental composition varying in a continuous fashion from the center of the core particle to the surface of the core particle. The temperature conditions depend on the metal element species of the metal oxide, and may desirably be a temperature range where interdiffusion between the second and third metal elements and the Si can occur, for example. To give a concrete example, in cases where Ni and Ge are used, a temperature higher than or equal to 800° C. may be desirable.

In the reducing heat treatment according to the Ellingham diagram, the metal oxides of the second and third metal elements as the coating would be reduced into their corresponding second and third metals with, for example, Si and C, and the like, while interdiffusion of the second and third metal elements and the Si as the core particle occurs. The third configuration example of the negative electrode active material obtained in this way may have a structure of, for example, a compositional gradient structure having elemental composition varying in a continuous fashion from the center of the core particle (Si particle) to the surface of the core particle in the order of: a region containing Si and the second and third metal elements; a region containing the second and third metal elements. Note that the third configuration example of the negative electrode active material may have a compositional gradient structure which only has a region containing Si and the second and third metal elements, having elemental composition varying in a continuous fashion from the center of the core particle to the surface of the core particle as well. Alternatively, the third configuration example of the negative electrode active material may have a compositional gradient structure having elemental composition varying in a continuous fashion from the center of the core particle to the surface of the core particle in the order of: a region containing Si; a region containing Si and the second and third metal elements; a region containing the second and third metal elements.

In a part between the region containing Si and the second and third metal elements and the region containing Si and the second and third metal elements; and, within the region containing Si and the second and third metal elements, the elemental composition varies in a continuous fashion in which a compositional ratio of the Si is gradually decreased from the center to the surface; and each compositional ratio of the second and third metal elements is gradually increased from the center to the surface. Since the part between the region containing Si and the second and third metal elements and the region containing the second and third metal elements has a gradation of composition, the third configuration example of the negative electrode active material is in a state without clear boundaries.

For example, the second metal element such as Ge, which has an atomic radius at least 9 percent greater than that of Si, allows the lattice to strain while being substituted on Si sites. Therefore, usually, it tends to be difficult to achieve solid-phase diffusion to the depth of 50 nm or more by the reducing heat treatment at 1000° C. In this view, by introducing the third metal element with the second metal element, the third metal element having an atomic radius smaller than 109 percent of that of Si, it may make it possible to avoid the lattice strain to be caused by doping, and allow the second metal element as well as the third metal element to be diffused from the surface of the Si particle into a deeper position thereof.

The third metal element may desirably be one that has greater ΔG with respect to oxygen molecules (1 mol) in Ellingham diagram than ΔG of Si with respect to oxygen molecules (1 mol) in Ellingham diagram, and that also has good compatibility with Si. Examples of such elements include Co, Ni and Fe.

The second and third metal elements may desirably be those that are capable of forming a compound together, each of which is capable of forming a compound with Si. Examples of such combinations of the second and third metal elements include a combination in which: the second metal element is Ge; and the third metal element is one selected from Ni, Co and Fe.

A content of the second metal element is typically, for example, greater than 0 atomic percent and smaller than 1 atomic percent of Si; greater than 0 atomic percent and smaller than 0.5 atomic percent of Si; or greater than 0 atomic percent and smaller than 0.1 atomic percent of Si. A content of the third metal element is typically, for example, greater than 0 atomic percent and smaller than 1 atomic percent of Si; greater than 0 atomic percent and smaller than 0.5 atomic percent of Si; or greater than 0 atomic percent and smaller than 0.1 atomic percent of Si. By adding a slight amount of metal elements to Si, it is possible to improve the properties such as conductivity of the negative electrode active material. Typically, as the third metal element is to be co-doped with the second metal element for the purpose of diffusing the second metal element from the surface of the core particle into a deeper position thereof by solid-phase diffusion, for example, it may be desirable that the content of the third metal element be smaller than that of the second metal element.

(Case of Third Configuration Example of Negative Electrode Active Material)

As one case of the third configuration example of the negative electrode active material, a case in which Ge oxide and Ni oxide are used as the coating will be illustrated.

This case of the third configuration example is one obtained by forming a Ge oxide thin film and a Ni oxide thin film as the coating on a Si particle as the core particle, by sol-gel hydrolysis process and the like; followed by reducing Ge oxide and Ni oxide by the reducing heat treatment using Ellingham diagram ($GeO_x$->Ge). Further, in this case, Ge and Ni as the reduced product of the coating and Si have undergone interdiffusion with each other by the reducing heat treatment.

The negative electrode active material thus formed is one having the Si particle subjected to coating and the reduced products of the Ni oxide and Ge oxide being made as one part; the Ge and Ni having undergone solid-phase diffusion into the Si at the same time; and a compositional gradient structure having elemental composition of Si, Ni and Ge varying in a continuous fashion from the center to the surface of the particle.

In this case of the third configuration example, Ge and Ni as the reduced product of the coating have been diffused by solid-phase diffusion into Si as the core particle; and the negative electrode active material has a compositional gradient structure having elemental composition varying in a continuous fashion from the center to the surface of the particle. For example, the elemental composition varies in a continuous fashion from the center of the core particle (Si particle) to the surface of the core particle, in the order of: a region containing Si, Ge and Ni; a region containing Ge and Ni. Note that, alternatively, this may be a structure that only has a region containing Si, Ge and Ni, having elemental composition varying in a continuous fashion from the center of the core particle (Si particle) to the surface of the core particle as well. In the region containing Si, Ge and Ni, the elemental composition varies in a continuous fashion in which a compositional ratio of the Si is gradually decreased from the center to the surface; and each compositional ratio of the Ge and Ni is gradually increased from the center to the surface.

In this case of the third configuration example, between a Si rich region at the center side and a Ge rich and Ni rich region at the surface side of the negative electrode active material, the elemental composition varies in a continuous fashion, and the core particle and Ge and Ni which are the reduced product of the coating are made as one part in a state without clear boundaries. Note that, for example, in the region containing at least two of the elements Si, Ge, and Ni, the at least two of the elements may bond with one another.

2. Second Embodiment

A second embodiment of the present disclosure will be described. The second embodiment of the present disclosure is a battery such as a lithium-ion secondary battery, using for a negative electrode a negative electrode active material of the above-described first embodiment. In the following, an example of configuration of a battery will be described with reference to the drawings.

(Configuration of Battery)

Figure 2:
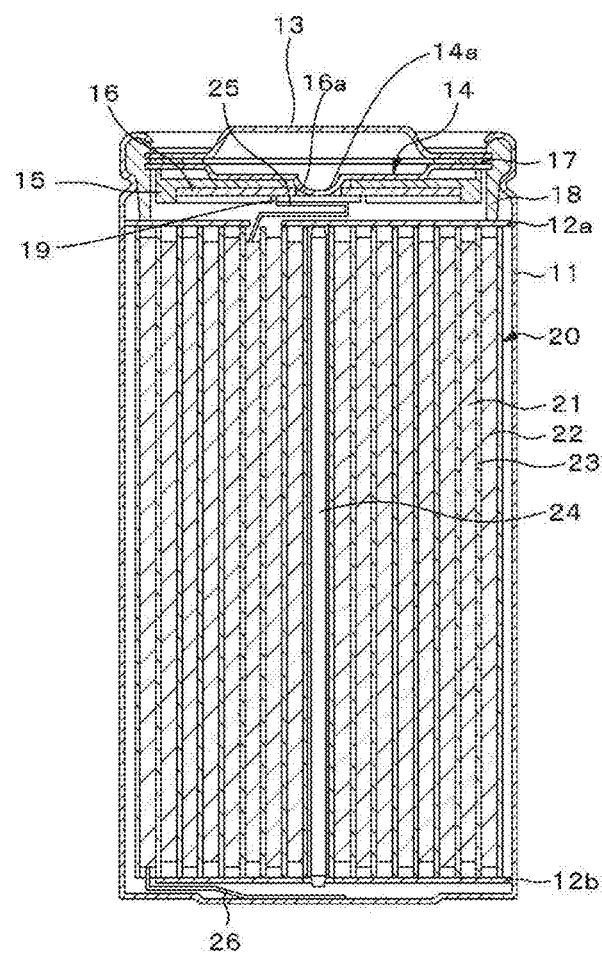
FIG. 2 is a cross-sectional view showing an example of a battery according to a second embodiment of the present disclosure.

A battery of the second embodiment of the present disclosure will be described with reference to FIG. 2. FIG. 2 is a cross-sectional view showing an example of a battery according to the second embodiment of the present disclosure. An example of the battery according to the second embodiment is a non-aqueous electrolyte battery, and may be, for example, a chargeable and dischargeable non-aqueous electrolyte secondary battery. The battery may be, for example, a lithium-ion secondary battery. This battery is a so-called "cylinder type" battery, and has a spirally wound electrode body 20 and a non-aqueous electrolytic solution which is a liquid electrolyte (not shown) provided inside a hollow and substantially cylinder-shaped battery can 11. The spirally wound electrode body 20 has a strip-like positive electrode 21 and a strip-like negative electrode 22 spirally wound together with a separator 23 in between.

The battery can 11 is made of iron plated with nickel, for example. One end of the battery can 11 is closed and the other end is open. A pair of insulating plates 12*a* and 12*b* is disposed in the inside of the battery can 11 vertically against the wound peripheral surface such that the spirally wound electrode body 20 is sandwiched between the insulating plates 12*a* and 12*b*.

Examples of materials of the battery can 11 include iron (Fe), nickel (Ni), stainless steel (SUS), aluminum (Al), titanium (Ti) and the like. Further, for example, the battery can 11 may be plated with nickel or the like so that it can prevent electrochemical corrosion by the non-aqueous electrolytic solution following charging and discharging of the battery. In the open end of the battery can 11, a battery lid 13 which is a positive-electrode lead plate is installed by caulking via a gasket 18 for insulating and sealing the inside of the battery can 11, with a safety valve mechanism and a positive temperature coefficient element (PTC element) 17 provided on the inner side of the battery lid 13.

The battery lid 13 is made of the same material as the battery can 11, and is provided with an opening to emit gas generated inside the battery, for example. The safety valve mechanism has a safety valve 14, a disc holder 15 and a cutoff disc 16, layered from the top in this order. A protruding part 14*a* of the safety valve 14 is connected to a positive-electrode lead 25 that is lead out from the spirally wound electrode body 20, via a sub-disc 19 that has been placed to cover a hole 16a being provided in the center of the cutoff disc 16. By connecting the safety valve 14 and the positive-electrode lead 25 via the sub-disc 19, it is able to prevent the positive-electrode lead 25 from being drawn into the hole 16*a* at the time of reversal of the safety valve 14. Further, the safety valve mechanism is electrically connected to the battery lid 13 through the PTC element 17.

The safety valve mechanism is configured so that if the internal pressure of the battery reaches or exceeds a certain level due to internal short-circuit, heating from the outside of the battery, or the like, the safety valve 14 would be reversed to cut off the electrical connection of the protruding part 14a, the battery lid 13 and the spirally wound electrode body 20. That is, if the safety valve 14 is reversed, the positive-electrode lead 25 would be pressed by the cutoff disc 16, and the connection between the safety valve 14 and positive-electrode lead 25 would be cancelled. The disc holder 15 is made of an insulating material. When the safety valve 14 is reversed, the safety valve 14 is insulated from the cutoff disc 16.

In addition, in cases where the generation of gas inside the battery goes on and the internal pressure of the battery rises further, a part of the safety valve 14 may break to release the gas to the battery lid 13 side.

Furthermore, for example, the cutoff disc 16 is provided with a plurality of degassing-holes (not shown) around its hole 16a, which makes a configuration capable of efficiently releasing the gas to the battery lid 13 side when the gas is generated from the spirally wound electrode body 20.

In the PTC element 17, when the temperature rises, the resistance value rises; and the PTC element 17 is able to interrupt a current by cutting off the electrical connection between the battery lid 13 and the spirally wound electrode body 20. The PTC element 17 thus prevents abnormal heat generation to be caused due to a large current. The gasket 18 is made of, for example, an insulating material, and asphalt is coated on the surface thereof.

The spirally wound electrode body 20 contained inside the battery is spirally wound centering on, for example, a center pin 24. The spirally wound electrode body 20 is made by the positive electrode 21 and the negative electrode 22 being laminated on one another with the separator 23 interposed therebetween; and being spirally wound in a longitudinal direction thereof.

The positive electrode lead 25 is connected to the positive electrode 21. A negative electrode lead 26 is connected to the negative electrode 22. The positive electrode lead 25 is welded to the safety valve 14, and it is electrically connected to the battery lid 13 as described above. The negative electrode lead 26 is welded to the battery can 11 to be electrically connected thereto.

Figure 3:
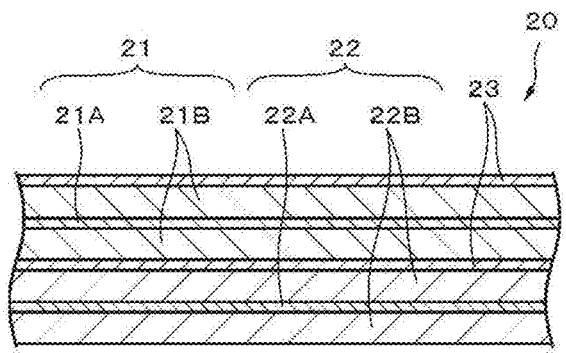
FIG. 3 is an enlarged cross-sectional view showing a part of the spirally wound electrode body 20 shown in FIG. 2.

FIG. 3 is an enlarged cross-sectional view showing a part of the spirally wound electrode body 20 shown in FIG. 2. In the following, the positive electrode 21, the negative electrode 22, and the separator 23 will be described in detail.

(Positive Electrode)

The positive electrode 21 may have, for example, a double-side formation part which includes a positive electrode current collector 21A having a pair of surfaces, and positive electrode active material layers 21B provided on both of these surfaces. Alternatively, although not shown in the drawing, the positive electrode 21 may have a single-side formation part which is made up of the positive electrode current collector 21A being provided with the positive electrode active material layer 21B on only one of the surfaces thereof. The positive electrode current collector 21A may be made of, for example, a metal foil such as an aluminum foil.

The positive electrode active material layer 21B includes, as a positive electrode active material, one or more kinds of positive electrode materials capable of intercalating and deintercalating lithium. The positive electrode active material layer 21B may further include other materials such as binding agent and conducting agent, if necessary.

Examples of the positive electrode materials capable of intercalating and deintercalating lithium include a lithium-containing compound; and the lithium-containing compound may be desirable, because it may make it possible to obtain high energy density. Examples of such lithium-containing compounds include: a composite oxide that contains lithium and a transition metal element; a phosphate compound that contains lithium and a transition metal element; and the like. Among such compounds, one that contains at least one transition metal element selected from the group consisting of cobalt (Co), nickel (Ni), manganese (Mn) and iron (Fe) may be more desirable, because it may make it possible to obtain higher voltage.

Examples of the positive electrode materials that can be used include lithium-containing compounds represented by $Li_xM1O_2$ or $Li_yM2PO_4$. In these formulae, M1 and M2 each represent at least one transition metal element. The values of "x" and "y" vary depending on the charging and discharging state of the battery, and are usually within the range of $0.05 \leq x \leq 1.10$ and $0.05 \leq y \leq 1.10$. Examples of the composite oxides that contain lithium and transition metal elements include lithium cobalt composite oxide ($Li_xCoO_2$); lithium nickel composite oxide ($Li_xNiO_2$); lithium nickel cobalt composite oxide ($Li_xNi_{1-z}Co_zO_2$ ($0<z<1$)); lithium nickel cobalt manganese composite oxide ($Li_xNi_{(1-v-w)}Co_vMn_wO_2$ ($0<v+w<1$, $v>0$, $w>0$)); lithium manganese composite oxide ($LiMn_2O_4$) or lithium manganese nickel composite oxide ($LiMn_{2-t}Ni_tO_4$ ($0<t<2$)) having a spinel-type structure; and the like. Among these compounds, the composite oxides containing cobalt may be desirable, because it may make it possible to obtain high capacity and good cycle characteristics. Examples of the phosphate compounds that contain lithium and transition metal elements include lithium iron phosphate ($LiFePO_4$); lithium iron manganese phosphate ($LiFe_{1-u}Mn_uPO_4$); and the like.

Specific examples of such lithium composite oxides include lithium cobalt oxide ($LiCoO_2$); lithium nickel oxide ($LiNiO_2$); lithium manganese oxide ($LiMn_2O_4$); and the like. In addition, it is possible to use a solid solution in which some transition metal atoms are substituted by different element atoms. Examples thereof include lithium nickel cobalt composite oxides ($LiNi_{0.5}Co_{0.5}O_2$, $LiNi_{0.8}Co_{0.2}O_2$, etc.) and lithium nickel cobalt aluminum composite oxides ($LiNi_{0.80}Co_{0.15}Al_{0.05}O_2$, etc.). These lithium composite oxides are able to produce high voltage, and they have excellent energy density.

Furthermore, with a view to obtain more highly-filled electrode and even better cycle characteristics, the surface of the particle of any one of the above-mentioned lithium-containing compounds may be coated with fine particles of another the lithium-containing compound, and may be used as a composite particle.

In addition, other examples of the positive electrode materials capable of intercalating and deintercalating lithium include oxides such as vanadium oxide ($V_2O_5$), titanium dioxide ($TiO_2$) and manganese dioxide ($MnO_2$); disulfides such as iron disulfide ($FeS_2$), titanium disulfide ($TiS_2$) and molybdenum disulfide ($MoS_2$); niobium diselenide ($NbSe_2$) and other chalcogenides (especially layer compounds and spinel-type compounds) which do not contain lithium; as well as lithium-containing compounds that contain lithium; and also conductive polymers such as sulfur, polyaniline, polythiophene, polyacetylene and polypyrrole. It is possible that materials other than the above may be used as the positive electrode material capable of intercalating and deintercalating lithium, as a matter of course. Further, the above-mentioned series of positive electrode materials may be used in combination of two or more.

(Conducting Agent)

Examples of the conducting agents that can be used include carbon materials such as carbon black and graphite.

(Binding Agent)

Examples of the binding agents that can be used include those having at least one material selected from resin materials such as polyvinylidene fluoride (PVdF), polytetrafluoroethylene (PTFE), polyacrylonitrile (PAN), styrene-butadiene rubber (SBR) and carboxymethyl cellulose (CMC); as well as copolymers made of such resin materials.

(Negative Electrode)

The negative electrode 22 may have, for example, a double-side formation part which includes a negative electrode current collector 22A having a pair of surfaces, and negative electrode active material layers 22B provided on both of these surfaces. Alternatively, although not shown in the drawing, the negative electrode 22 may have a single-side formation part which is made up of the negative electrode current collector 22A being provided with the negative electrode active material layer 22B on only one of the surfaces thereof. The negative electrode current collector 22A may be made of, for example, a metal foil such as a copper foil.

As one configuration example of the negative electrode active material layer 22B, it may include, as a negative electrode active material, one or more kinds of negative electrode materials capable of intercalating and deintercalating lithium; and may further include other materials such as binding agent and conducting agent similar to those in the positive electrode active material layer 21B, if necessary.

As the negative electrode material, one of the negative electrode active materials which have been described by the first embodiment may be used.

(Separator)

The separator 23 is configured to separate the positive electrode 21 and the negative electrode 22, preventing the possible electric short-circuiting due to a contact of the two electrodes while allowing the passage of lithium-ion. Examples of the separator 23 include a porous film having an average porous diameter about 5 μm or smaller, and specifically: a porous film made of synthetic resin such as polytetrafluoroethylene, polypropylene and polyethylene; a porous film made of ceramic; a separator made by laminating two or more kinds of these porous films, and the like. The separator 23 is impregnated with an electrolytic solution which is a liquid electrolyte.

(Non-Aqueous Electrolytic Solution)

The non-aqueous electrolytic solution contains an electrolyte salt and a non-aqueous solvent which dissolves this electrolyte salt.

The electrolyte salt may include, for example, one or more light metal compounds such as lithium salts. Examples of the lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), lithium hexafluoro silicate ($LiSiF_6$), lithium chloride (LiCl), lithium bromide (LiBr) and the like. Among them, it may be desirable to use at least one selected from the group consisting of lithium hexafluorophosphate, lithium tetrafluoroborate, lithium perchlorate, and lithium hexafluoroarsenate; and lithium hexafluorophosphate may be more desirable.

Examples of the non-aqueous solvents include lactone-series solvents such as γ-butyrolactone, γ-valerolactone, δ-valerolactone and ε-caprolactone; carbonic acid ester-series solvents such as ethylene carbonate, propylene carbonate, butylene carbonate, vinylene carbonate, dimethyl carbonate, ethyl methyl carbonate and diethyl carbonate; ether-series solvents such as 1,2-dimethoxyethane, 1-ethoxy-2-methoxyethane, 1,2-diethoxyethane, tetrahydrofuran and 2-methyltetrahydrofuran; nitrile-series solvents such as acetonitrile; sulfolane-series solvents; phosphoric acids; phosphoric ester solvents; pyrrolidones; and the like. The non-aqueous solvents may be used either singly or in combination of two or more.

Further, as the non-aqueous solvent, it may be desirable to use a mixture of a cyclic carbonate ester and a chain carbonate ester; and it may be more desirable that the non-aqueous solvent include a compound obtained by fluorinating a part or all of the hydrogen atoms of the cyclic carbonate ester or the chain carbonate ester. As this fluorinated compound, it may be desirable to use fluoroethylene carbonate (4-fluoro-1,3-dioxolan-2-one; FEC) or difluoroethylene carbonate (4,5-difluoro-1,3-dioxolan-2-one; DFEC), because it may make it possible to improve charge-discharge cycle characteristics even when the negative electrode active material containing the compounds of silicon (Si), tin (Sn), germanium (Ge) or the like is to be used as the negative electrode 22. Among them, it is desirable to use difluoroethylene carbonate as the non-aqueous solvent, because it would be effective in improving cycle characteristics.

(Method of Producing Battery)

(Method of Producing Positive Electrode)

A positive electrode mixture is prepared by mixing a positive electrode material, a conducting agent and a binding agent. This positive electrode mixture is then dispersed in a solvent such as N-methyl-2-pyrrolidone to provide positive electrode mixture slurry in a paste form. Subsequently, the positive electrode mixture slurry is coated on a surface of the positive electrode current collector 21A, and then the solvent is dried. Then by being subjected to compression molding by a roll press or the like, the positive electrode active material layer 21B is formed, and thus the positive electrode 21 is prepared.

(Method of Producing Negative Electrode)

A negative electrode mixture is prepared by mixing a negative electrode material and the binding agent. This negative electrode mixture is then dispersed in a solvent such as N-methyl-2-pyrrolidone to provide negative electrode mixture slurry in a paste form. Subsequently, the negative electrode mixture slurry is coated on a surface of the negative electrode current collector 22A, and then the solvent is dried. Then by being subjected to compression molding by a roll press or the like, the negative electrode active material layer 22B is formed, and thus the negative electrode 22 is prepared.

(Preparation of Non-Aqueous Electrolytic Solution)

The non-aqueous electrolytic solution is prepared by dissolving the electrolyte salt into the non-aqueous solvent.

(Assembly of Battery)

The positive electrode lead 25 is attached to the positive electrode current collector 21A by welding or the like; and the negative electrode lead 26 is attached to the negative electrode current collector 22A by welding or the like. After that, the positive electrode 21 and the negative electrode 22 are spirally wound via the separator 23, to form the spirally wound electrode body 20.

Subsequently, while a tip end of the positive electrode lead 25 is welded to the safety valve mechanism, a tip end of the negative electrode lead 26 is welded to the battery can 11. After that, the spirally wound electrode body 20 is sandwiched by the pair of insulating plates 12a and 12b from the wound peripheral surfaces thereof, and then housed inside the battery can 11. After the spirally wound electrode body 20 is housed inside the battery can 11, the non-aqueous electrolytic solution is injected into the inside of the battery can 11, and the separator 23 is impregnated with the non-aqueous electrolytic solution. After that, the battery lid 13, the safety valve mechanism including the safety valve 14 and the like, and the PTC element 17 are caulked via the gasket 18 at the open end of the battery can 11, to be fixed. Thus, the battery according to the embodiment shown in FIG. 1 is formed.

3. Third Embodiment (Example of Battery Pack)

Figure 4:
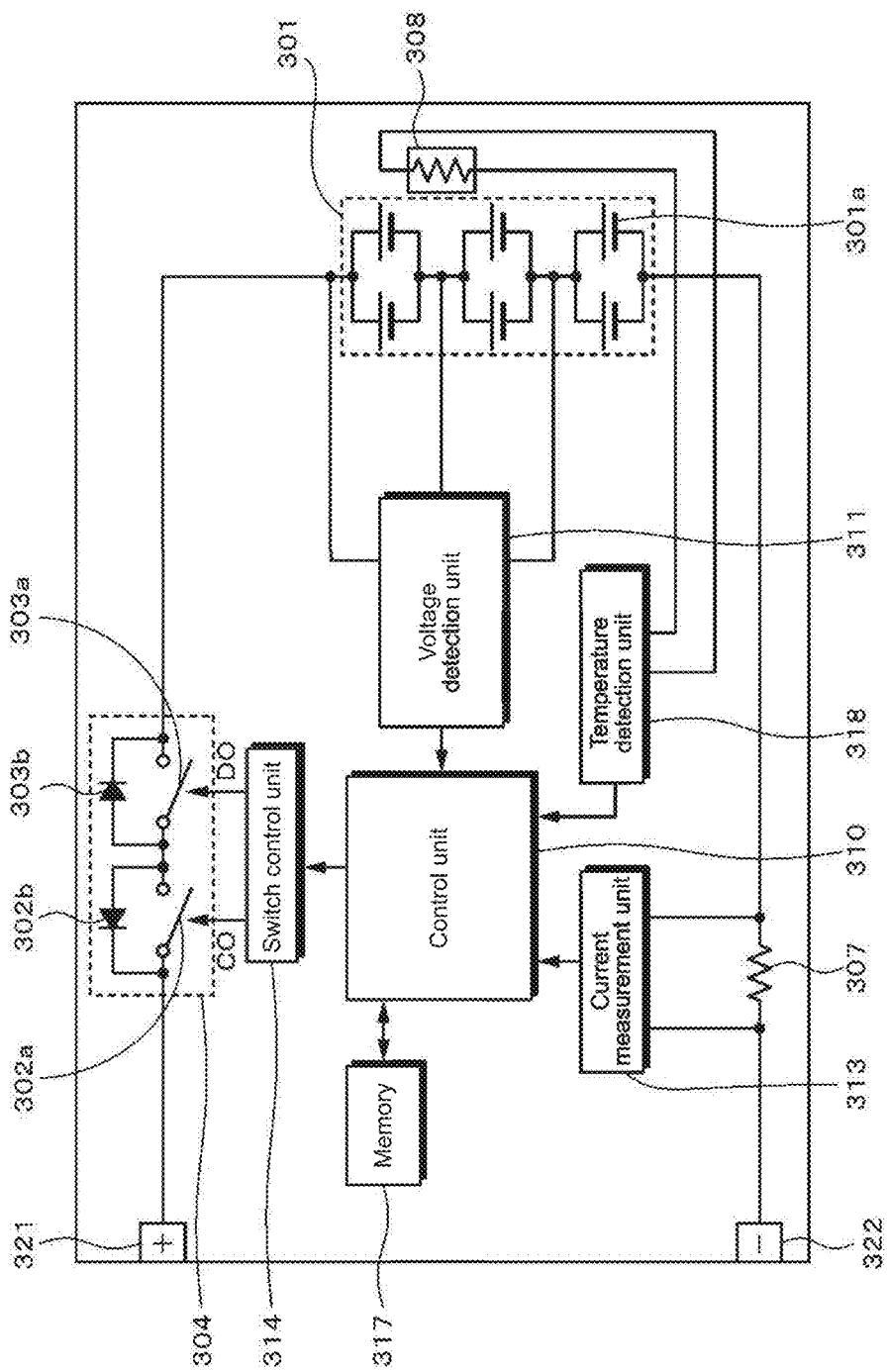
FIG. 4 is a is a block diagram showing a configuration example of a battery pack according to a third embodiment of the present disclosure.

FIG. 4 is a block diagram showing a circuit configuration example of a case where a battery of a second embodiment of the present disclosure (hereinafter, arbitrarily referred to as "secondary battery") is applied to a battery pack. The battery pack includes an assembled battery 301, an exterior, a switch unit 304 having a charge control switch 302a and a discharge control switch 303a, a current sensing resistor 307, a temperature sensing device 308, and a control unit 310.

Further, the battery pack includes a positive terminal 321 and a negative terminal 322. In charging, the positive terminal 321 and the negative terminal 322 are connected to a positive terminal and a negative terminal of a charger, respectively, and the charging is carried out. On the other hand, when using an electronic apparatus, the positive terminal 321 and the negative terminal 322 are connected to a positive terminal and a negative terminal of the apparatus, respectively, and the discharge is carried out.

The assembled battery 301 is configured with a plurality of the secondary batteries 301a connected to one another in series and/or in parallel. The secondary battery 301a is a secondary battery of an embodiment of the present disclosure. It should be noted that although there is shown in FIG. 4 a case where the six secondary batteries 301a are connected in two batteries in parallel and three in series (2P3S configuration) as an example, also others, such as n in parallel and m in series (where n and m are integers), and any way of connections may be adopted.

The switch unit 304 includes a charge control switch 302a and a diode 302b, and a discharge control switch 303a and a diode 303b and is controlled by a control unit 310. The diode 302b has the polarity in opposite direction with respect to charge current flowing from the positive terminal 321 to the assembled battery 301 and in forward direction with respect to discharge current flowing from the negative terminal 322 to the assembled battery 301. The diode 303b has the polarity in forward direction with respect to the charge current and in opposite direction with respect to the discharge current. It should be noted that although in this example the switch unit 304 is provided on the positive terminal side, it may otherwise be provided on the negative terminal side.

The charge control switch 302a is configured to be turned off in the case where a battery voltage reaches an overcharge detection voltage, and it is controlled by the control unit 310 such that the charge current does not flow in a current path of the assembled battery 301. After the charge control switch 302a is turned off, only discharge can be performed via the diode 302b. Further, in the case where a large amount of current flows at a time of charge, the charge control switch 302a is turned off and is controlled by the control unit 310 such that the charge current flowing in the current path of the assembled battery 301 is shut off.

The discharge control switch 303a is configured to be turned off in the case where a battery voltage reaches an overdischarge detection voltage, and it is controlled by the control unit 310 such that the discharge current does not flow in a current path of the assembled battery 301. After the discharge control switch 303a is turned off, only charge can be performed via the diode 303b. Further, in the case where a large amount of current flows at a time of discharge, the discharge control switch 303a is turned off and is controlled by the control unit 310 such that the discharge current flowing in the current path of the assembled battery 301 is shut off.

A temperature sensing device 308 is a thermistor, for example, provided in the vicinity of the assembled battery 301. The temperature sensing device 308 is configured to measure a temperature of the assembled battery 301 and supply the measured temperature to the control unit 310. A voltage detection unit 311 is configured to measure voltages of the assembled battery 301 and each of the secondary batteries 301a included in the assembled battery 301, then A/D-convert the measured voltages, and supply them to the control unit 310. A current measurement unit 313 is configured to measure a current using a current detection resistor 307 and supply the measured current to the control unit 310.

The switch control unit 314 is configured to control the charge control switch 302a and the discharge control switch 303a of the switch unit 304 on the basis of the voltage and the current that are input from the voltage detection unit 311 and the current measurement unit 313. The switch control unit 314 is configured to transmit a control signal of the switch unit 304 when a voltage of any one of secondary batteries 301a reaches the overcharge detection voltage or less or the overdischarge detection voltage or less, or, a large amount of current flows rapidly, in order to prevent overcharge, overdischarge, and over-current charge and discharge.

Here, in the case where the secondary batteries 301a are lithium-ion secondary batteries, an overcharge detection voltage is defined to be 4.20 V±0.05 V for example, and an overdischarge detection voltage is defined to be 2.4 V±0.1 V for example.

For a charge and discharge control switch, a semiconductor switch such as a MOSFET (metal-oxide semiconductor field-effect transistor) can be used. In this case, parasitic diodes of the MOSFET function as the diodes 302b and 303b. In the case where p-channel FETs (field-effect transistors) are used as the charge and discharge control switch, the switch control unit 314 supplies a control signal DO and a control signal CO to a gate of the charge control switch 302a and that of the discharge control switch 303a, respectively. In the case where the charge control switch 302a and the discharge control switch 303a are of p-channel type, the charge control switch 302a and the discharge control switch 303a are turned on by a gate potential lower than a source potential by a predetermined value or more. In other words, in normal charge and discharge operations, the control signals CO and DO are determined to be a low level and the charge control switch 302a and the discharge control switch 303a are turned on.

Further, for example, when overcharged or overdischarged, the control signals CO and DO are determined to be a high level and the charge control switch 302a and the discharge control switch 303a are turned off.

A memory 317 includes a RAM (random access memory), a ROM (read only memory), an EPROM (erasable programmable read only memory) serving as a nonvolatile memory, or the like. In the memory 317, numerical values computed by the control unit 310, an internal resistance value of a battery in an initial state of each secondary battery 301a, which has been measured in a stage of a manufacturing process, and the like are stored in advance, and can be rewritten as appropriate. Further, when a full charge capacity of the secondary battery 301a is stored, for example, a remaining capacity can be calculated together with the control unit 310.

A temperature detection unit 318 is provided, to measure the temperature using the temperature sensing device 308 and control charging or discharging when abnormal heat generation has occurred, or perform correction in calculation of the remaining capacity.

4. Fourth Embodiment

The above-mentioned battery of the second embodiment of the present disclosure and the battery pack of the third embodiment can be installed or be used in providing electricity to apparatus such as electronic apparatus, electric vehicle and electrical storage apparatus, for example.

Examples of electronic apparatus are laptops, PDA (Personal Digital Assistant), cellular phones, cordless telephone handset, video movies, digital still cameras, electronic books, electronic dictionaries, music players, radio, headphones, game machine, navigation system, memory cards, pacemakers, hearing aids, electric tools, electric shavers, refrigerator, air-conditioner, televisions, stereos, water heater, microwave oven, dishwasher, washing machine, dryer, lighting equipments, toys, medical equipments, robots, load conditioners, traffic lights, and the like.

Examples of electric vehicles are railway vehicles, golf carts, electric carts, electric motorcars (including hybrid motorcars), and the like. The above-mentioned embodiments would be used as their driving power source or auxiliary power source.

Examples of electrical storage apparatus include power sources for electrical storage to be used by power generation facilities or buildings such as houses.

Among examples of application mentioned in the above, a specific example of power storage system which has adopted a battery in embodiments of the present disclosure will be described below.

The power storage system may employ the following configurations, for example. A first power storage system is a power storage system having an electrical storage apparatus configured to be charged by a power generating device that generates electricity from renewable energy. A second power storage system has an electrical storage apparatus, and is configured to provide electricity to an electronic apparatus connected to the electrical storage apparatus. A third power storage system is a configuration of an electronic apparatus in such a way as to receive electricity supply from an electrical storage apparatus. These power storage systems are realized as a system in order to supply electricity efficiently in cooperation with an external power supply network.

Furthermore, a fourth power storage system is a configuration of an electric vehicle, including a converter configured to receive electricity supply from an electrical storage apparatus and convert the electricity into driving force for vehicle, and further including a controller configured to process information on vehicle control on the basis of information on the electrical storage apparatus. A fifth power storage system is an electricity system including an electricity information transmitting-receiving unit configured to transmit and receive signals via a network to and from other apparatuses, in order to control the charge and discharge of the above-mentioned electrical storage apparatus on the basis of information received by the transmitting-receiving unit. The sixth power storage system is an electricity system configured to receive electricity supply from the above-mentioned electrical storage apparatus or provide the electrical storage apparatus with electricity from at least one of a power generating device and a power network. The power storage system is described below.

4-1. Power Storage System for Houses as Application Example

Figure 5:
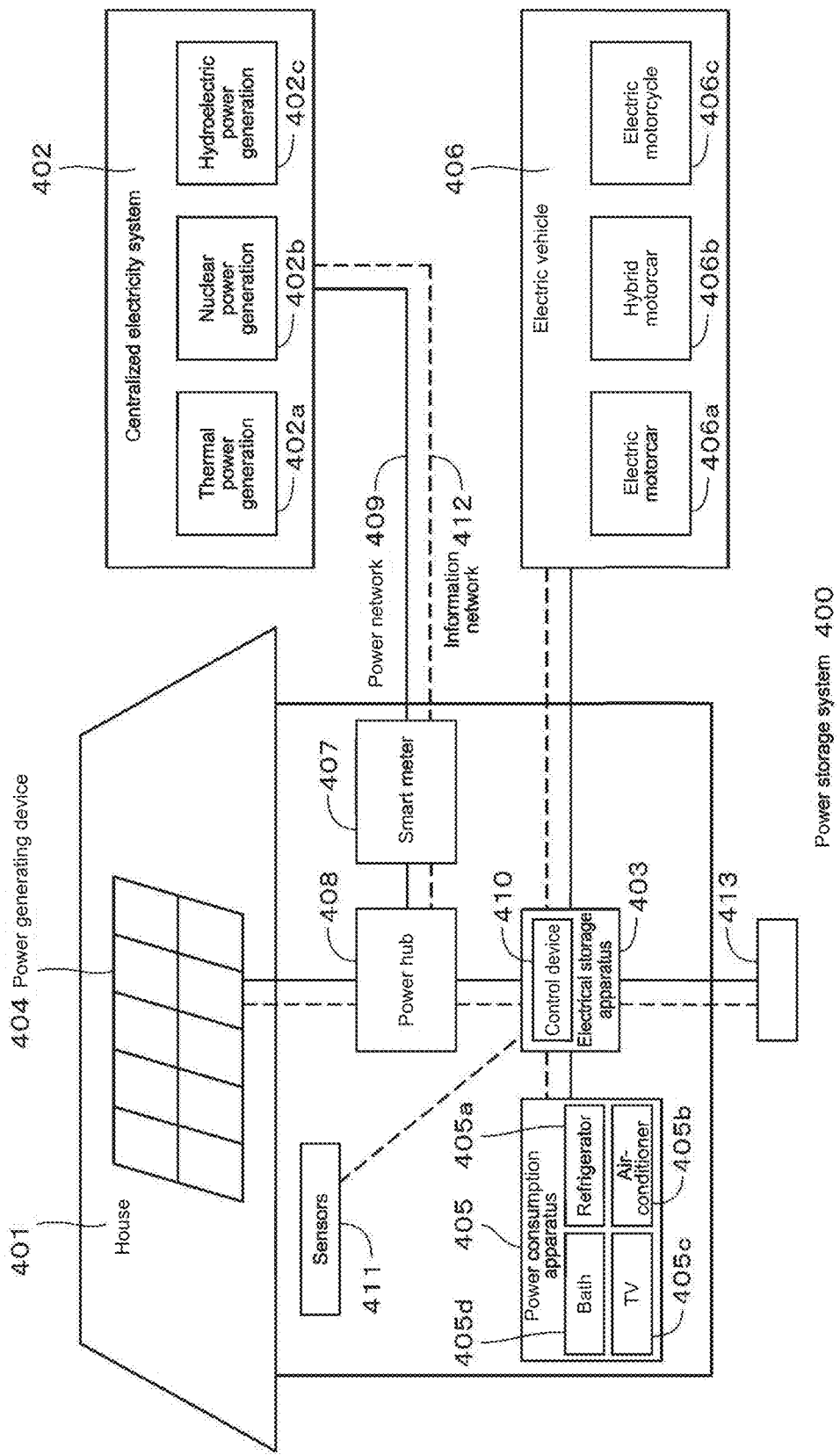
FIG. 5 is a schematic view showing an application example of power storage system for houses, using a battery according to an embodiment of the present disclosure.

An example of a case where electrical storage apparatus using the battery of an embodiment of the present disclosure is applied to power storage system for houses will be described with reference to FIG. 5. For example, in power storage system 400 for a house 401, electricity is provided to an electrical storage apparatus 403 from a centralized electricity system 402 including thermal power generation 402a, nuclear power generation 402b, hydroelectric power generation 402c and the like via power network 409, information network 412, smart meter 407, power hub 408 and the like. Along with this, from independent power source such as in-house power generating device 404, electricity is also provided to the electrical storage apparatus 403. Therefore, electricity given to the electrical storage apparatus 403 is stored. By using the electrical storage apparatus 403, electricity to be used in the house 401 can be supplied. Not only for a house 401, but also with respect to other buildings, similar power storage system can be applied.

The house 401 is provided with the power generating device 404, a power consumption apparatus 405, an electrical storage apparatus 403, a control device 410 that controls each device or apparatus, a smart meter 407, and sensors 411 that obtain various kinds of information. The devices or apparatus are connected to one another through the power network 409 and the information network 412. For the power generating device 404, a solar battery, a fuel battery, or the like is used, and the generated electricity is supplied to the power consumption apparatus 405 and/or the electrical storage apparatus 403. Examples of the power consumption apparatus 405 include a refrigerator 405a, an air-conditioner 405b, a television receiver 405c, and a bath 405d. In addition, the power consumption apparatus 405 includes an electric vehicle 406. Examples of the electric vehicle 406 include an electric motorcar 406a, a hybrid motorcar 406b, and an electric motorcycle 406c.

The above-mentioned battery of an embodiment of the present disclosure is applied to the electrical storage apparatus 403. The battery of an embodiment of the present disclosure may be, for example, configured by the above-mentioned lithium-ion secondary battery. The smart meter 407 has functions of measuring the used amount of commercial electricity and transmitting the measured used amount to an electricity company. The power network 409 may be any one of DC power feeding, AC power feeding, and noncontact supply of electricity, or may be such that two or more of them are combined.

Examples of various sensors 411 include a human detection sensor, an illumination sensor, an object detection sensor, a power consumption sensor, a vibration sensor, a contact sensor, a temperature sensor and an infrared sensor. The information obtained by the various sensors 411 is transmitted to the control device 410. The state of the weather conditions, the state of a person, and the like are understood on the basis of the information from the sensors 411, and the power consumption apparatus 405 can be automatically controlled to minimize energy consumption.

In addition, it is possible for the control device 410 to transmit information on the house 401 to an external electricity company and the like through the Internet.

Processing, such as branching of electricity lines and DC/AC conversion, is performed by using a power hub 408. Examples of a communication scheme for an information network 412 that is connected with the control device 410 include a method of using a communication interface, such as UART (Universal Asynchronous Receiver-Transceiver: transmission and reception circuit for asynchronous serial communication), and a method of using a sensor network based on a wireless communication standard, such as Bluetooth, ZigBee, and WiFi. The Bluetooth method can be applied to multimedia communication, so that one-to-many connection communication can be performed. ZigBee uses the physical layer of IEEE (Institute of Electrical and Electronics Engineers) 802.15.4. IEEE 802.15.4 is the title of the short-distance wireless network standard called personal area network (PAN) or wireless (W) PAN.

The control device 410 is connected to an external server 413. The server 413 may be managed by one of the house 401, an electricity company, and a service provider. The information that is transmitted and received by the server 413 is, for example, information on power consumption information, life pattern information, an electricity fee, weather information, natural disaster information, and electricity transaction. These pieces of information may be transmitted and received from a power consumption apparatus (for example, television receiver) inside a household. Alternatively, the pieces of information may be transmitted and received from an out-of-home device (for example, a mobile phone, etc.). These pieces of information may be displayed on a device having a display function, for example, a television receiver, a mobile phone, or a personal digital assistant (PDA).

The control device 410 that controls each unit includes central processing unit (CPU), a random access memory (RAM), a read only memory (ROM), and the like. In this example, the control device 410 is stored in the electrical storage apparatus 403. The control device 410 is connected to the electrical storage apparatus 403, the in-house power generating device 404, the power consumption apparatus 405, the various sensors 411, and the server 413 through the information network 412, and has functions of adjusting the use amount of the commercial electricity, and the amount of power generation. In addition, the control device 410 may have a function of performing electricity transaction in the electricity market.

As described above, not only the centralized electricity system 402 in which electricity comes from thermal power generation 402a, nuclear power generation 402b, hydroelectric power generation 402c, or the like, but also the generated electricity from the in-house power generating device 404 (solar power generation, wind power generation) can be stored in the electrical storage apparatus 403. Therefore, even if the generated electricity of the in-house power generating device 404 varies, it is possible to perform control such that the amount of electricity to be sent to the outside is made constant or electric discharge is performed by only a necessary amount. For example, usage is possible in which electricity obtained by the solar power generation is stored in the electrical storage apparatus 403, late night power whose fee is low during nighttime is stored in the electrical storage apparatus 403, and the electricity stored by the electrical storage apparatus 403 is discharged and used in a time zone in which the fee during daytime is high.

In this example, an example has been described in which the control device 410 is stored in the electrical storage apparatus 403. Alternatively, the control device 410 may be stored in the smart meter 407 or may be configured singly. In addition, the power storage system 400 may be used by targeting a plurality of households in a block of apartments or may be used by targeting a plurality of single-family detached houses.

4-2. Power Storage System for Vehicles as Application Example

Figure 6:
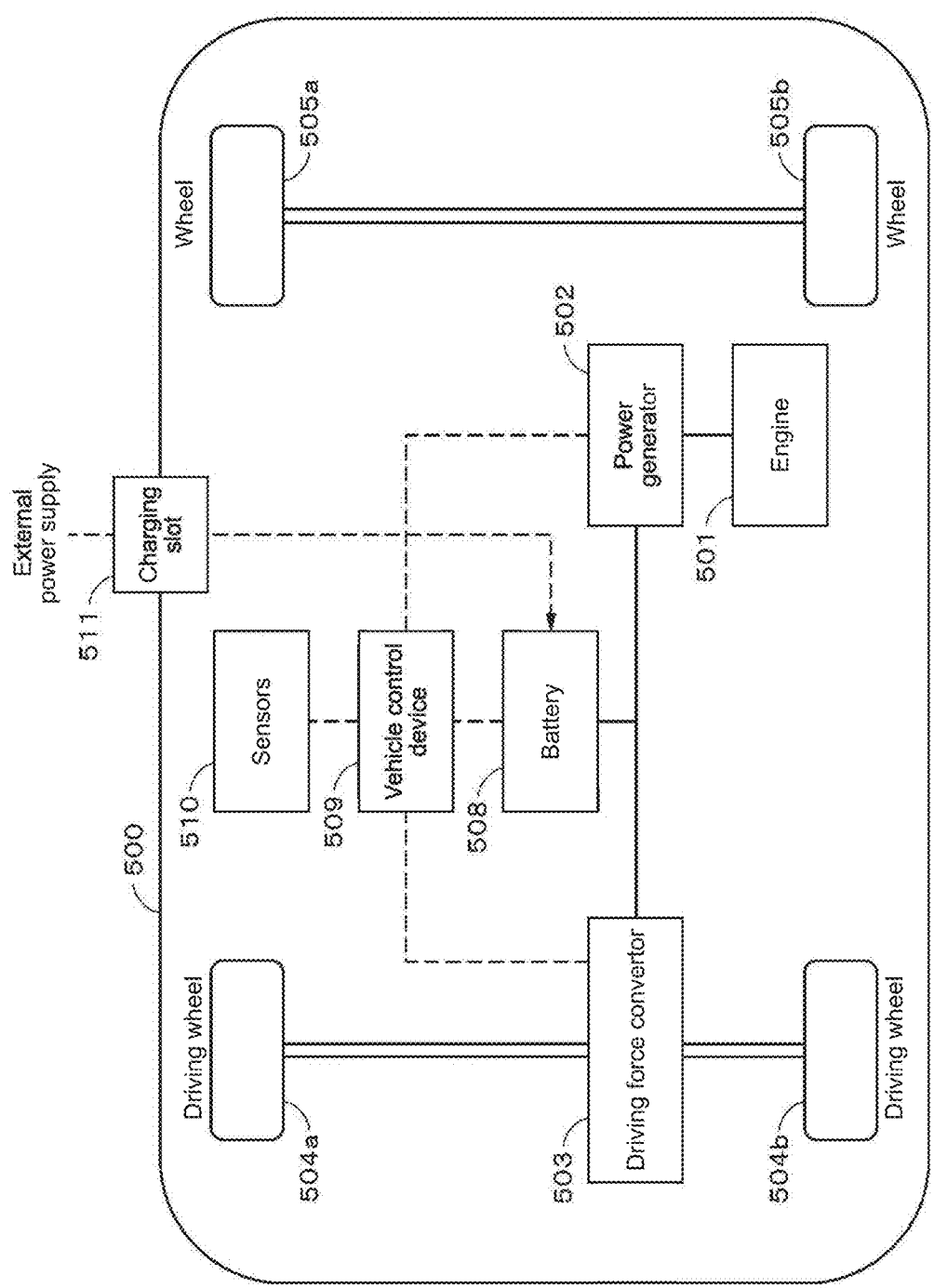
FIG. 6 is a schematic view showing an application example of power storage system for houses, using a battery according to an embodiment of the present disclosure.

An example of a case where an embodiment of the present disclosure is applied to a power storage system for vehicles will be described with reference to FIG. 6. FIG. 6 schematically shows an example of configuration of a hybrid vehicle employing series-hybrid system, in which an embodiment of the present disclosure is applied. A series-hybrid system is a car that runs using electricity driving force converter by using electricity generated by a power generator that is driven by an engine or by using electricity that is temporarily stored in a battery.

A hybrid vehicle 500 is equipped with an engine 501, a power generator 502, an electricity driving force converter 503, a driving wheel 504a, a driving wheel 504b, a wheel 505a, a wheel 505b, a battery 508, a vehicle control device 509, various sensors 510, and a charging slot 511. The above-mentioned battery of an embodiment of the present disclosure is applied to the battery 508.

The hybrid vehicle 500 runs by using the electricity driving force converter 503 as a power source. An example of the electricity driving force converter 503 is a motor. The electricity driving force converter 503 operates using the electricity of the battery 508, and the rotational force of the electricity driving force converter 503 is transferred to the driving wheels 504a and 504b. By using direct current-alternating current (DC-AC) or inverse conversion (AC-DC conversion) at a necessary place, the electricity driving force converter 503 can use any of an AC motor and a DC motor. The various sensors 510 are configured to control the engine revolution speed through the vehicle control device 509 or control the opening (throttle opening) of a throttle valve, although not shown in the drawing. The various sensors 510 include a speed sensor, an acceleration sensor, an engine revolution speed sensor, and the like.

The rotational force of the engine 501 is transferred to the power generator 502, and the electricity generated by the power generator 502 by using the rotational force can be stored in the battery 508.

When a hybrid vehicle 500 decelerates by a braking mechanism, although not shown in the drawing, the resistance force at the time of the deceleration is added as a rotational force to the electricity driving force converter 503. The regenerative electricity generated by the electricity driving force converter 503 by using the rotational force can be stored in the battery 508.

The battery 508, as a result of being connected to an external power supply of the hybrid vehicle 500, receives supply of electricity by using a charging slot 511 as an input slot from the external power supply, and can store the received electricity.

Although not shown in the drawing, the embodiment of the present disclosure may include an information processing device that performs information processing for vehicle control on the basis of information on a secondary battery. Examples of such information processing devices include an information processing device that performs display of the remaining amount of a battery on the basis of the information on the remaining amount of the battery.

In the foregoing, a description has been made referring to an example of a series-hybrid car that runs using a motor by using electricity generated by a power generator that is driven by an engine or by using electricity that had once been stored in a battery. However, the embodiment according to the present disclosure can be effectively applied to a parallel hybrid car in which the outputs of both the engine and the motor are used as a driving source and in which switching between three methods, that is, running using only an engine, running using only a motor, and running using an engine and a motor, is performed as appropriate. In addition, the embodiment according to the present disclosure can be effectively applied to a so-called motor-driven vehicle that runs by driving using only a driving motor without using an engine.

EXAMPLES

The present disclosure will now be described by way of examples thereof. It should be noted that the present disclosure is not restricted to the examples below.

Example 1

In Example 1, by sol-gel hydrolysis process, a Ge oxide thin film was formed on a Si particle; followed by reducing the Ge oxide by the reducing heat treatment with the use of a reduction method using Ellingham diagram; and thus negative electrode active materials of Samples 1-1 to 1-6 were obtained.

(Sample 1-1)

In the process of coating with the Ge oxide ($GeO_x$), a Si powder was put into a preparation solution, the preparation solution being prepared by dissolving Ge isopropoxide in IPA (isopropyl alcohol) as a solvent, in an atmospheric environment; followed by drying in a beaker or on a dish on a hotplate at 80° C. for 60 minutes. Thus, a negative electrode active material having a Si particle as the core particle with a coating layer containing $GeO_x$ being coated thereon (referred to as "Sample 1-0") was obtained.

Next, Sample 1-0 was subjected to reducing heat treatment. The reducing heat treatment was performed under an atmosphere of a mixed gas of $N_2$ and $H_2$, at the conditions of 650° C. for 9 hours. Thus, the Ge oxide coated on the Si particle was reduced in a way according to Ellingham diagram, and Sample 1-1 having the Si particle and the reduced product of the Ge oxide being made as one part was obtained.

(Sample 1-2)

Sample 1-2 was obtained in the same manner as in Sample 1-1 except that the temperature for the reducing heat treatment was changed to 400° C.

(Sample 1-3)

Sample 1-3 was obtained in the same manner as in Sample 1-1 except that the temperature for the reducing heat treatment was changed to 600° C.

(Sample 1-4)

Sample 1-4 was obtained in the same manner as in Sample 1-1 except that the temperature for the reducing heat treatment was changed to 800° C.

(Sample 1-5)

Sample 1-5 was obtained in the same manner as in Sample 1-1 except that the temperature for the reducing heat treatment was changed to 1000° C.

(Sample 1-6)

Sample 1-6 was obtained in the same manner as in Sample 1-1 except that the atmosphere for the reducing heat treatment was changed to an air atmosphere.

(Characterization of Example 1)

(SEM (Scanning Electron Microscope) Observation and EDX (Energy Dispersive X-Ray Spectroscopy) Mapping)

Figure 7:
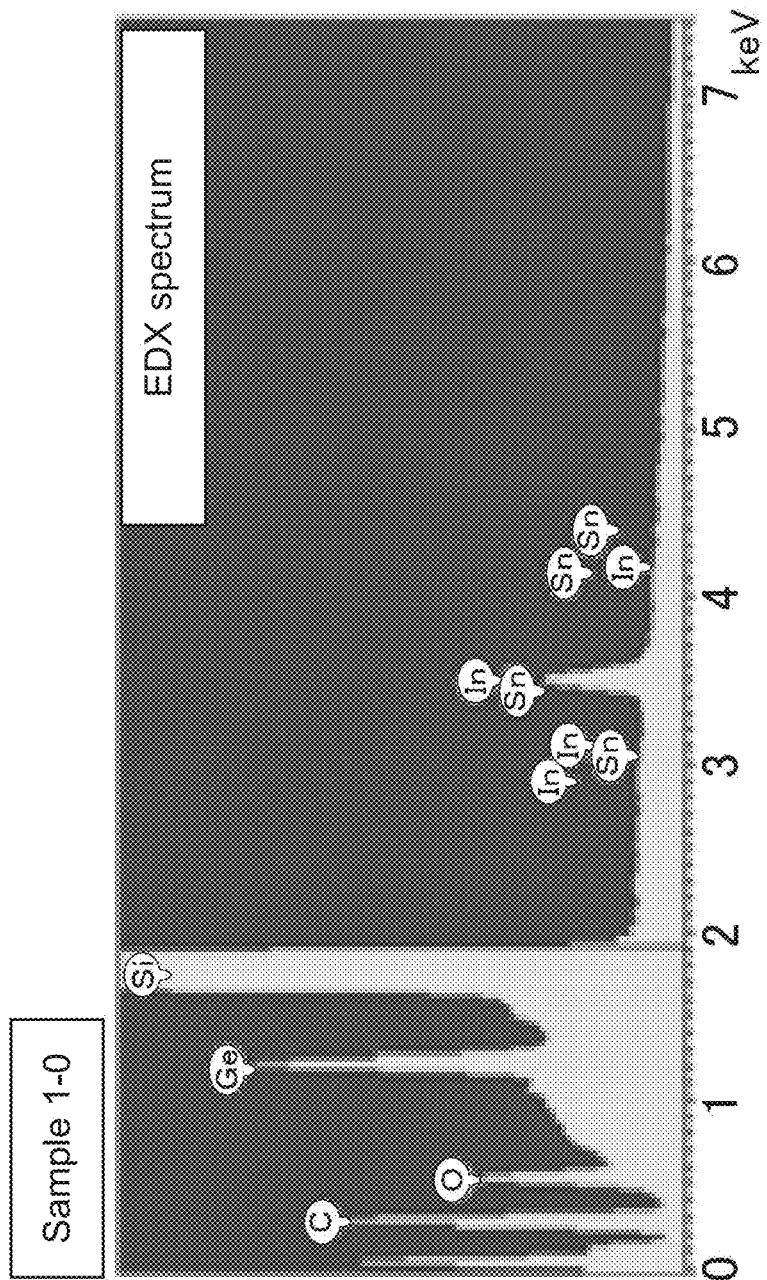
FIG. 7 is an EDX spectrum of Sample 1-0.

SEM observation and EDX elemental mapping were performed to the $GeO_x$-coated Si particle (Sample 1-0). FIG. 7 shows an EDX spectrum as a result of measurement. FIG. 8A shows a SEM image of Sample 1-0. FIGS. 8B and 8C show elemental mapping images of Sample 1-0. Note that the peaks originating from In and Sn in FIG. 7 were detected due to a sample holder that was used in the measurement, but not due to Sample 1-0.

From the result of the measurement, it was confirmed that Sample 1-0 was a $GeO_x$-coated Si particle in which $GeO_x$ was substantially uniformly formed on the surface of the Si particle. Note that Samples 1-1 to 1-6 are those which were obtained by subjecting this Sample 1-0 to the reducing heat treatment.

(XRD (X-Ray Diffraction) Measurement)

XRD measurement was performed with respect to Samples 1-1 to 1-6. FIG. 9A shows XRD patterns of Samples 1-2 to 1-5. FIG. 9B shows XRD patterns of Samples 1-0, 1-1 and 1-6.

Note that in FIG. 9A, the lines a1, a2, a3 and a4 respectively show the XRD patterns of Samples 1-2, 1-3, 1-4 and 1-5. In FIG. 9B, the lines b1, b2, and b3 respectively show the XRD patterns of Samples 1-0, 1-6, and 1-1.

As indicated by the line a2, reduction crystallization of Ge at 600° C. was confirmed. Further, as indicated by the line a4, a peak originating from SiGe was observed according to Sample 1-5 which had undergone the heat treatment at 1000° C.; and interdiffusion between the Ge as the reduced product of the Ge oxide and the Si was confirmed by the treatment at 1000° C. It can be considered that this Sample 1-5 formed a negative electrode active material that had a compositional gradient structure having elemental composition of Si→Si+Ge→Ge, varying in a continuous fashion from the center to the surface of the core particle; in which, the part between a Si rich region and a Ge rich region was in a state without clear boundaries.

In addition, as indicated by the XRD pattern of Sample 1-1 (line b3) in FIG. 9B, when the reducing heat treatment was performed under the reducing atmosphere, the Ge oxide was reduced to produce Ge. However, as indicated by the XRD pattern of Sample 1-6 (line b2), when the treatment was performed under the air atmosphere, the Ge was not produced, and $GeO_2$ was produced instead. Therefore, it was revealed that it is possible to control the resultant coating obtained from the reducing heat treatment to either Ge oxide or metal Ge.

(XPS Measurement)

XPS measurement was performed with respect to Samples 1-0 and 1-1. FIG. 10A shows Ge 3d5/2 spectra of XPS. FIG. 10B shows Si 2p spectra of XPS. FIG. 10C shows O 1s spectra of XPS.

As shown in FIGS. 10A to 10C, in Sample 1-1, with the shift of Ge 3d5/2 peak, it was found that the $GeO_2$ of Sample 1-0 was reduced to Ge. In Sample 1-1, also, increase in $Ge^{3+}$ and $Ge^{2+}$ peaks, and $Si^{3+}$ and $Si^{1+}$ peaks, as compared to those of Sample 1-0 was observed. The peak indicating SiO(GeO) was increased, too. From such results, is was found that in Sample 1-1, with the reducing heat treatment of Sample 1-0, Si worked as a reductant to produce the reduced product of Ge oxide and to produce an oxide of Si.

Regarding this Sample 1-1, it can be considered that a gradation structure of Ge/GeO+SiO/SiO$_2$/Si was formed. Note that in cases where it was intended to form a state without clear boundaries between the core particle and the reduced product of the coating as in Sample 1-5, it may be obtained by performing the reducing heat treatment at 1000° C.

(Characterization of Negative Electrode and Battery Made by Using Negative Electrode)

(Preparation of Negative Electrode)

A negative electrode was prepared by using the previously prepared negative electrode active material of Sample 1-1. Sample 1-1, a polyimide and a carbon powder were mixed, and the resultant mixture was dispersed in N-methyl-2-pyrrolidone as a solvent to provide negative electrode mixture slurry. Subsequently, the negative electrode mixture slurry was coated on a copper foil which was a negative electrode current collector, followed by drying. Then by being subjected to compression molding by a roll press or the like, the negative electrode in which the negative electrode active material layer was formed on the negative electrode current collector was obtained.

(Preparation of Half-Cell)

A half-cell (referred to as "half-cell 1-1") having the previously prepared negative electrode as a working electrode and a Li foil as a counter electrode was prepared. An electrolytic solution was prepared by dissolving LiPF$_6$ at a concentration of 1 mol/kg to a mixed solvent obtained by mixing ethylene carbonate (EC) and dimethyl carbonate (DMC) in a given volume ratio (EC:DMC=1:1). A polyethylene microporous film was used as a separator.

(Preparation of Battery (Lithium-Ion Secondary Battery))

(Battery 1-1)

(Positive Electrode)

A positive electrode made by using lithium nickel cobalt aluminum composite oxide (LiNi$_{0.80}$Co$_{0.15}$Al$_{0.05}$O$_2$) as a positive electrode active material was prepared in the following manner.

The lithium nickel cobalt aluminum composite oxide (LiNi$_{0.80}$Co$_{0.15}$Al$_{0.05}$O$_2$) as the positive electrode active material, graphite as a conducting agent and polyvinylidene fluoride as a binding agent were mixed to prepare a positive electrode mixture. This positive electrode mixture was then dispersed in N-methyl-2-pyrrolidone to provide positive electrode mixture slurry. Subsequently, the positive electrode mixture slurry was coated on an aluminum foil which was a positive electrode current collector, followed by drying. Then by being subjected to compression molding by a roll press or the like, the positive electrode in which the positive electrode active material layer was formed on the positive electrode current collector was obtained.

(Coin Cell)

The above-described positive and negative electrodes were stamped out in a circular shape having a diameter of 15 mm, to prepare a coin cell (size 2016). As the electrolytic solution and the separator, the same ones as in the half-cell were used.

(Batteries 1-2 to 1-4)

As examples to be compared with the battery 1-1, batteries 1-2 to 1-4 were prepared in the same manner as in battery 1-1 except that the negative electrode active material was changed to the following materials.

(Negative Electrode Active Material of Battery 1-2)

A Si powder and a polyimide were dispersed in N-methyl-2-pyrrolidone, followed by drying, and were subjected to reducing heat treatment in vacuum at 700° C. By the heat treatment, the polyimide was carbonized and was coated on the surface of Si. Thus, a negative electrode active material having a structure in which the resultant product obtained from carbonization of the polyimide was coated on the surface of the Si particle was obtained.

(Negative Electrode Active Material of Battery 1-3)

A preparation solution being prepared by dissolving Ge isopropoxide in IPA (isopropyl alcohol) as a solvent, in an atmospheric environment, was dried in a beaker or on a dish on a hotplate at 80° C. for 60 minutes, thereby synthesizing a GeO$_x$ powder. The synthesized GeO$_x$ powder and a polyimide were dispersed in N-methyl-2-pyrrolidone, followed by drying, and were subjected to reducing heat treatment in vacuum at 700° C. By the heat treatment, the polyimide was carbonized and was coated on the surface of Si. Thus, a negative electrode active material having a structure in which the resultant product obtained from carbonization of the polyimide was coated on the surface of the Si particle was obtained.

(Negative Electrode Active Material of Battery 1-4)

A SiO powder (produced by Sigma-Aldrich Corporation) was used as the negative electrode active material.

(Battery 1-5)

The SiO powder (produced by Sigma-Aldrich Corporation) was used as the negative electrode active material; and a coin cell was prepared in the same manner as in the battery 1-1. Then, after charging the coin cell, the coin cell was disassembled; thus a SiO negative electrode in which Li was added was taken out. A coin cell was prepared again by using this SiO negative electrode.

(Characterization of Half-Cell)

Figure 11:
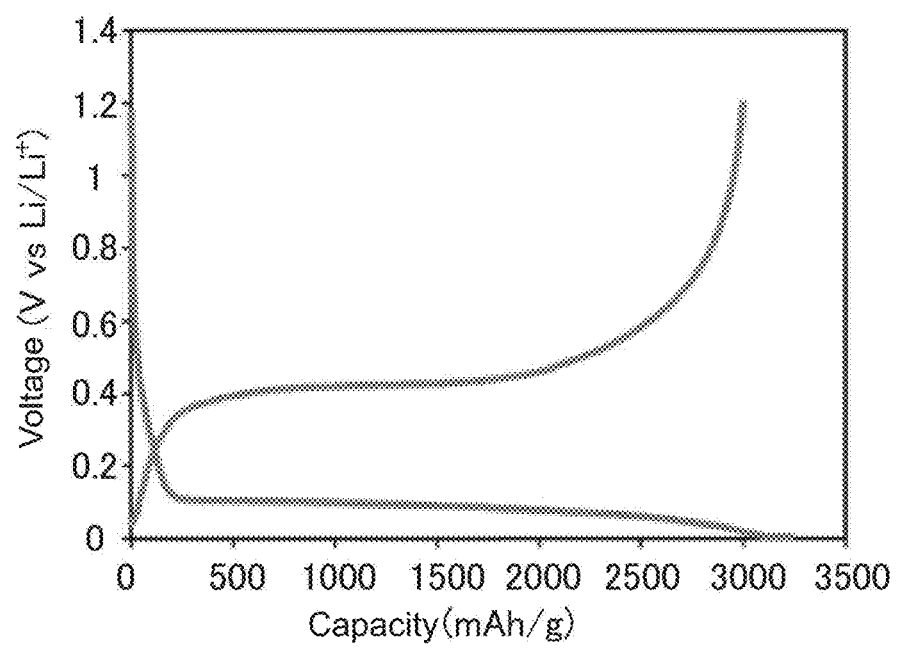
FIG. 11 is a charge-discharge graph of a half-cell 1-1.

Characterization of the prepared half-cell was performed at an environmental temperature of 25° C., a potential range of 0.0 V to 1.2 V, and a current of 0.1 C. FIG. 11 shows charge-discharge characteristics of the half-cell. Note that 1 C corresponds to the current value to charge/discharge the theoretical capacity in 1 hour; and 0.1 C corresponds to the current value to charge/discharge the theoretical capacity in 0.1 hour.

As shown in FIG. 11, the weight energy density was about 3200 mAh/g, and the initial efficiency was 95 percent, which was very high and above that of a Si negative electrode. Note that this result seems to be due to that an amount of the oxide in the outermost surface had become relatively small, as it is more difficult for Ge to form an oxidation film on the surface compared to Si; in which the oxide in the outermost surface makes irreversible capacity at the time of formation of SEI (Solid Electrolyte Interphase). However, the details are not known.

(Characterization of Batteries; Cycle Characteristics)

Cycle characteristics of the prepared batteries were measured in the following manner. Charging and discharging of the prepared batteries were repeatedly performed. Charging was performed at charging current of 0.5 C and charging cutoff voltage of 4.3 V. Discharging was performed at discharging current of 0.5 C and discharging cutoff voltage of 2.5 V. Retention of the discharge capacity against the number of charge-discharge cycles (percentages with respect to initial discharge capacity) was plotted. The initial discharge capacity was defined by the discharge capacity regarding the discharging of the second time which was performed after the charging of the second time.

Figures 12A, 12B:
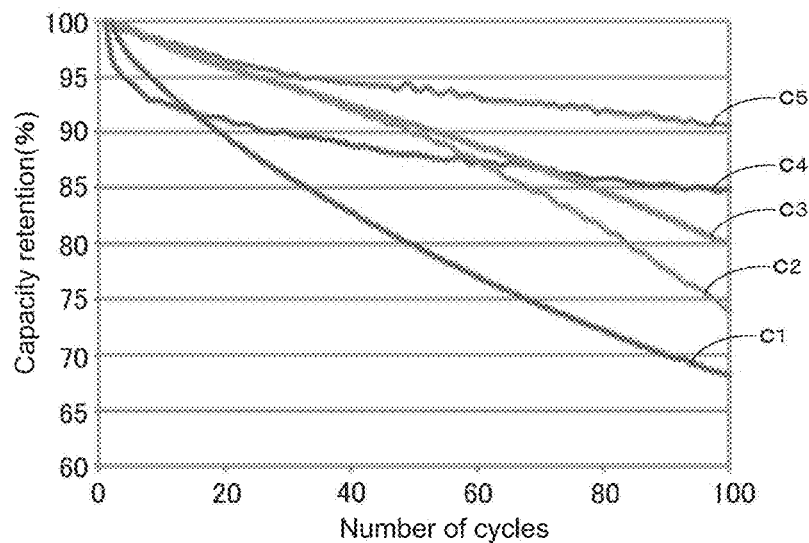
FIG. 12A is a table containing initial efficiency, density of capacity, capacity retention and tendency to deterioration.
FIG. 12B is a graph in which the retention is plotted against the number of charge-discharge cycles.

FIG. 12A shows a table containing: initial efficiency, density of capacity, capacity retention and tendency to deterioration. FIG. 12B shows a graph in which the retention is plotted against the number of charge-discharge cycles. As shown in FIGS. 12A and 12B, regarding the initial efficiency and the volume energy density, the battery 1-1, in which the negative electrode active material obtained by performing reducing heat treatment after forming the Ge oxide thin film on Si was used showed the most favorable data. Further, the battery 1-1 showed better cycle characteristics than those of the battery 1-2 in which the negative electrode active material without Ge coating on Si was used. In addition, in the result, the cycle characteristics of the battery 1-4 using SiO and the battery 1-3 using $GeO_x$ showed the tendency of upward-concave, and were beneficial to a long-term cycle of 500 times or more. On the other hand, in the battery 1-1, in spite of the Ge coating, the Si electrode showed the tendency of downward-concave as the tendency to deterioration, and the long-term cycle retention had become lower than that in the batteries 1-4 and 1-5. However, the cycle characteristics of the battery 1-1 were better than those of the batteries 1-2 and 1-3.

Example 2

In Example 2, by sol-gel hydrolysis process, a metal oxide thin film was formed on a Si particle; followed by reducing the metal oxide by the reducing heat treatment with the use of a reduction method using Ellingham diagram; and thus negative electrode active materials were obtained. In the process of preparation, the temperature conditions for the reducing heat processing were changed, or the species of metal oxides were changed. Then, characterization of the negative electrode active materials after their formation was performed.

(Samples 2-1 to 2-4)

In the same manner as in Samples 1-2 to 1-4, negative electrode active materials of Samples 2-1 to 2-4 were obtained. That is, in Samples 2-1 to 2-4, a Ge oxide as the metal oxide was coated on a Si particle, and the temperature conditions for the reduction treatment to reduce the Ge oxide being coated were set each to 400° C., 600° C., 800° C. and 1000° C.

(Samples 3-1 to 3-4)

In Samples 3-1 to 3-4, a Ge oxide and a Ni oxide were used as metal oxides to coat on a Si particle, and the temperature conditions for the reduction treatment were set each to 400° C., 600° C., 800° C. and 1000° C.

(Sample 3-1)

A Si powder was put into a preparation solution, the preparation solution being prepared by dissolving Ge isopropoxide in IPA (isopropyl alcohol) as a solvent, in an atmospheric environment; followed by drying in a beaker or on a dish on a hotplate at 80° C. for 60 minutes. After that, Ni acetate was dissolved in ethylene glycol; followed by drying in a beaker or on a dish on a hotplate at 200° C. for 60 minutes, in a similar manner.

After drying, the resultant product was ground in a mortar, and was subjected to reducing heat treatment. The reducing heat treatment was performed under an atmosphere of a mixed gas of $N_2$ and $H_2$, at the conditions of 400° C. for 1 hour. Thus, a negative electrode active material of Sample 3-1 was obtained.

(Sample 3-2)

A negative electrode active material of Sample 3-2 was obtained in the same manner as in Sample 3-1 except that the temperature for the reducing heat treatment was changed to 600° C.

(Sample 3-3)

A negative electrode active material of Sample 3-3 was obtained in the same manner as in Sample 3-1 except that the temperature for the reducing heat treatment was changed to 800° C.

(Sample 3-4)

A negative electrode active material of Sample 3-4 was obtained in the same manner as in Sample 3-1 except that the temperature for the reducing heat treatment was changed to 1000° C.

(Samples 4-1 to 4-4)

In Samples 4-1 to 4-4, a Ni oxide was used as the metal oxide, and the temperature conditions for the reduction treatment were set each to 400° C., 600° C., 800° C. and 1000° C.

(Sample 4-1)

A Si powder was put into a preparation solution, the preparation solution being prepared by dissolving Ge Ni acetate in ethylene glycol as a solvent; followed by drying in a beaker or on a dish on a hotplate at 200° C. for 60 minutes. After drying, the resultant product was ground in a mortar, and was subjected to reducing heat treatment at the conditions of 400° C. for 1 hour. Thus, a negative electrode active material of Sample 4-1 was obtained.

(Sample 4-2)

A negative electrode active material of Sample 4-2 was obtained in the same manner as in Sample 4-1 except that the temperature for the reducing heat treatment was changed to 600° C.

(Sample 4-3)

A negative electrode active material of Sample 4-3 was obtained in the same manner as in Sample 4-1 except that the temperature for the reducing heat treatment was changed to 800° C.

(Sample 4-4)

A negative electrode active material of Sample 4-4 was obtained in the same manner as in Sample 4-1 except that the temperature for the reducing heat treatment was changed to 1000° C.

(XRD Measurement)

Figures 13A, 13B, 13C:
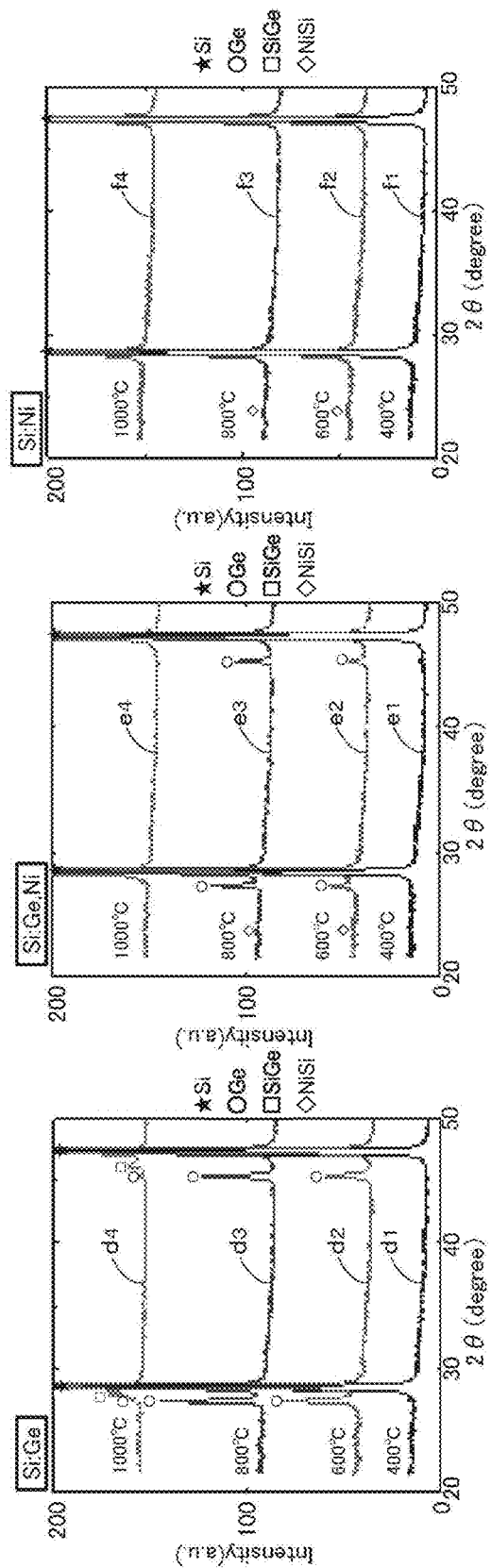
FIG. 13A shows XRD patterns of Samples 2-1 to 2-4.
FIG. 13B shows XRD patterns of Samples 3-1 to 3-4.
FIG. 13C shows XRD patterns of Samples 4-1 to 4-4.

XRD measurement was performed with respect to Samples 2-1 to 2-4, 3-1 to 3-4, and 4-1 to 4-4. FIG. 13A shows XRD patterns of Samples 2-1 to 2-4. FIG. 13B shows XRD patterns of Samples 3-1 to 3-4. FIG. 13C shows XRD patterns of Samples 4-1 to 4-4.

Note that, in FIG. 13A, the lines d1, d2, d3 and d4 respectively show the XRD patterns of Samples 2-1, 2-2, 2-3 and 2-4. In FIG. 13B, the lines e1, e2, e3 and e4 respectively show the XRD patterns of Samples 3-1, 3-2, 3-3 and 3-4. In FIG. 13C, the lines f1, f2, f3 and f4 respectively show the XRD patterns of Samples 4-1, 4-2, 4-3 and 4-4.

As shown in FIG. 13A, it was confirmed that in Samples 2-1 to 2-4, the reduction of Ge occurred at the temperature of 600° C. or higher; and SiGe was formed at 1000° C.

As shown in FIG. 13B, in cases where Ge and Ni were co-doped, existence of some NiSi was confirmed at 600° C., while metal Ni was not found. Since the metal Ni was found on the sapphire at 400° C., it can be considered that diffusion of Ni had already begun at 600° C. (This was also consistent with the relevant knowledge that the formation initiation temperature of $Ni_2Si$ is 400° C.) In cases where the treatment was performed at 1000° C., the peaks of Ge, SiGe, and NiSi had disappeared. It can be considered that this was because of the $NiSi_2$ having its lattice constant close to that of Si, which made it difficult to be observed by XRD. In addition, since Ni is able to be diffused deeper to the depth of 100 µm or more, it can be considered that Ni was diffused into the entire part of the Si. It can be considered that the disappearance of the Ge and SiGe peaks when Ge and Ni were co-doped to Si was because the Ge was diffused together with the Ni into the Si.

As shown in FIG. 13C, in cases where Ni was doped, existence of some NiSi was confirmed at 600° C., while metal Ni was not found. Similarly to the case of co-doping Ge and Ni, it can be considered that diffusion of Ni had already begun at 600° C. In cases where the treatment was performed at 1000° C., the peak NiSi had disappeared. Similarly to the case of co-doping Ge and Ni, it can be considered that this was because of the NiSi$_2$ having its lattice constant close to that of Si, which made it difficult to be observed by XRD. In addition, since Ni is able to be diffused deeper to the depth of 100 μm or more, it can be considered that Ni was diffused into the entire part of the Si.

(Experimental Example 1)
(XPS Measurement; Depth Measurement (XPS Analysis of Diffusion Depth))

XPS analysis of the diffusion depth of the case of co-doping Ge and Ni was performed. Since depth analysis would be difficult on the Si powder, the experiment was performed on the Si substrate. With a sol-gel process in the same manner as in Sample 2-1, a GeO$_x$ oxide coating and a NiO$_x$ oxide coating were formed on the Si substrate; and was subjected to reducing heat treatment. The reducing heat treatment was performed under an atmosphere of a mixed gas of N$_2$ and H$_2$, at the conditions of 1000° C. for 9 hours. After that, depth analysis by XPS was performed.

Figures 14A, 14B:
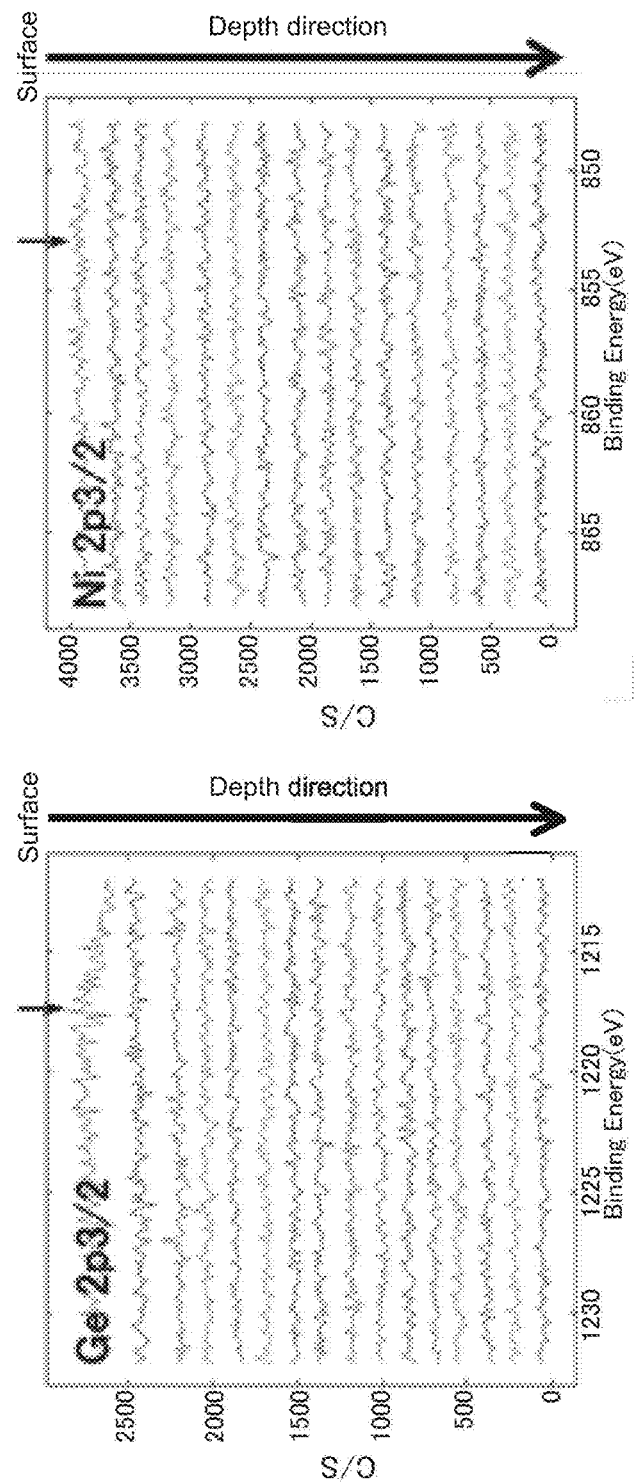
FIG. 14A shows a Ge 3d5/2 spectrum of XPS measured by Experimental example 1.
FIG. 14B shows a Ni 2p3/2 spectrum of XPS measured by Experimental example 1.

FIG. 14A shows a Ge 3d5/2 spectrum of XPS. FIG. 14B shows a Ni 2p3/2 spectrum of XPS. In each spectrum, no peak appeared at the position indicated by the arrow. Different from the cases where Ge was doped alone, it was found that both the amounts of Ge and Ni were not more than 0.1 atomic percent, which were below the detection limit. From this result, it can be considered that by co-doping Ge and Ni, Ge was diffused into the inside of the core particle (Si) from the surface thereof to a relatively deep position thereof.

(STEM-HAADF (Scanning Transmission Electron Microscope-High Angle Annular Dark Field) Observation, STEM/EDX Mapping)

Figure 15A:
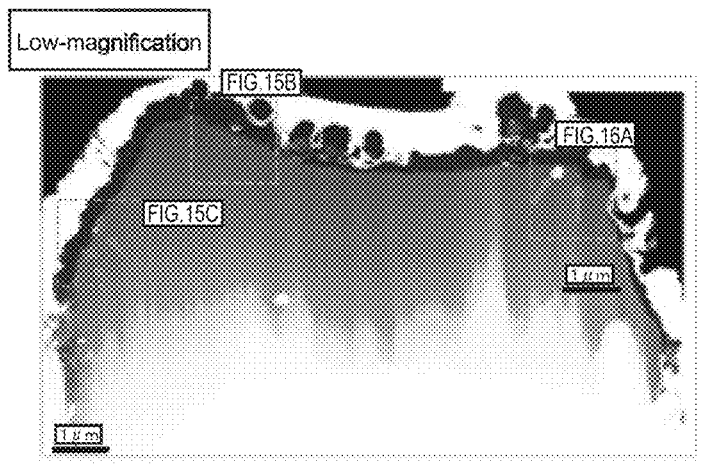
FIG. 15A shows a STEM-HAADF image of Sample 3-4.
Figure 15B:
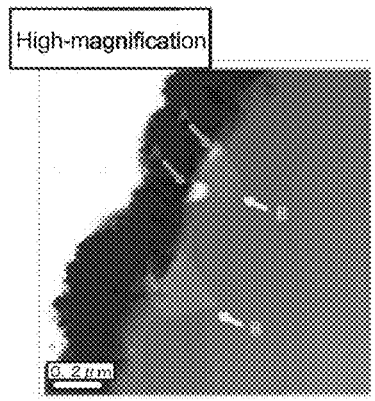
FIG. 15B is a high-magnification image of a part of FIG. 15A.
Figure 15C:
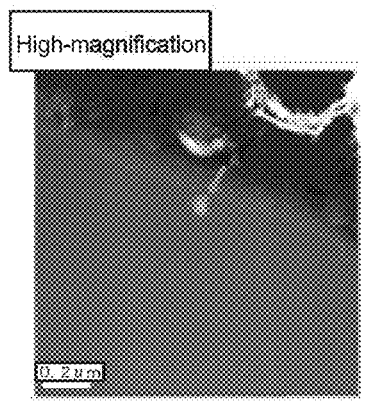
FIG. 15C is a high-magnification image of another part of FIG. 15A.
Figure 16A:
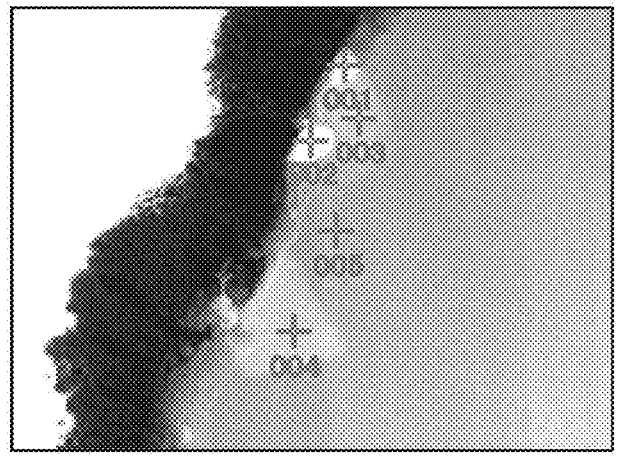
FIG. 16A shows a high-magnification image of still another part of FIG. 15A.
Figure 16B:
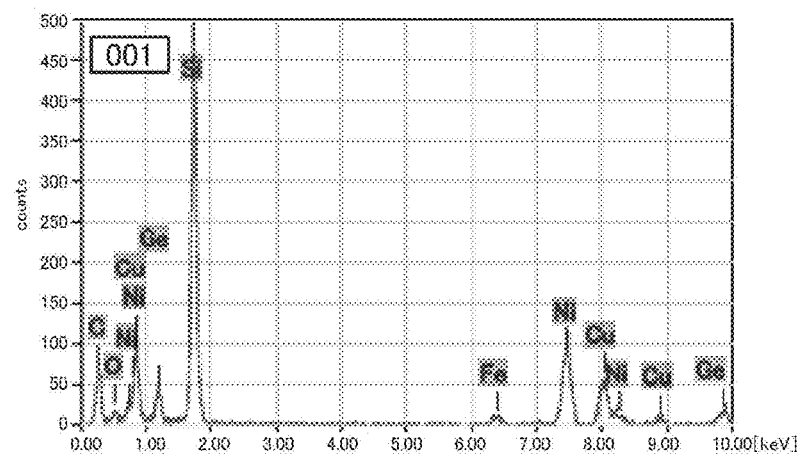
FIGS. 16B and 16C show EDX spectra.
Figure 16C:
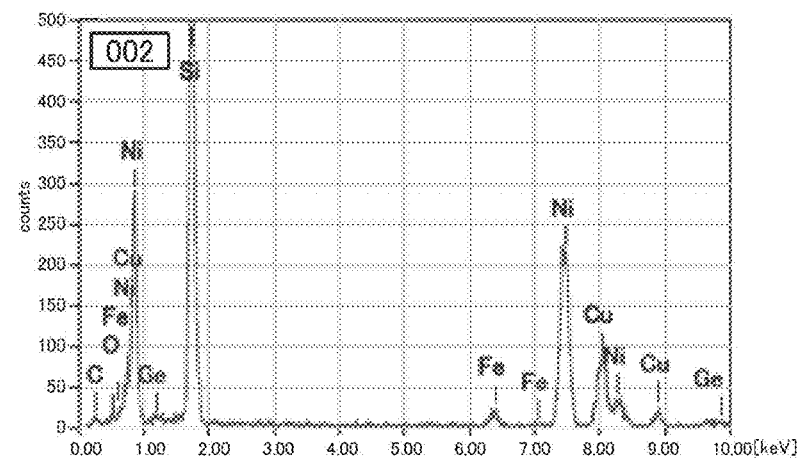
Figure 17A:
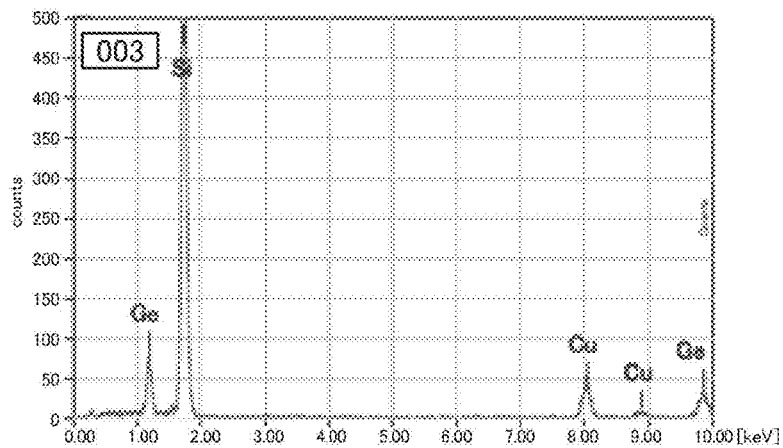
FIGS. 17A through 17C show EDX spectra.
Figure 17B:
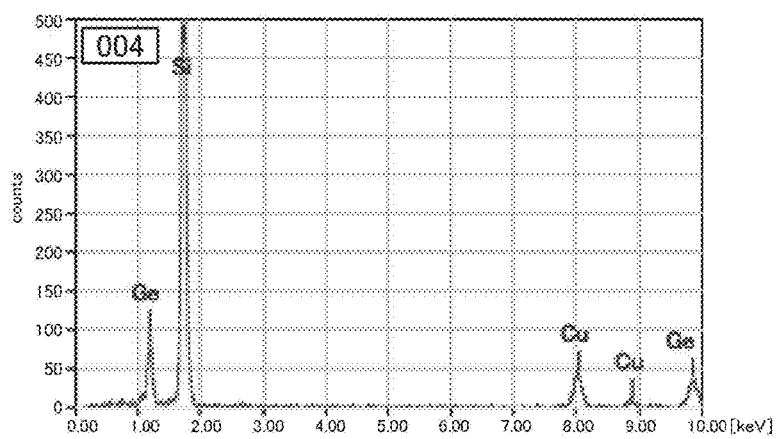
Figure 17C:
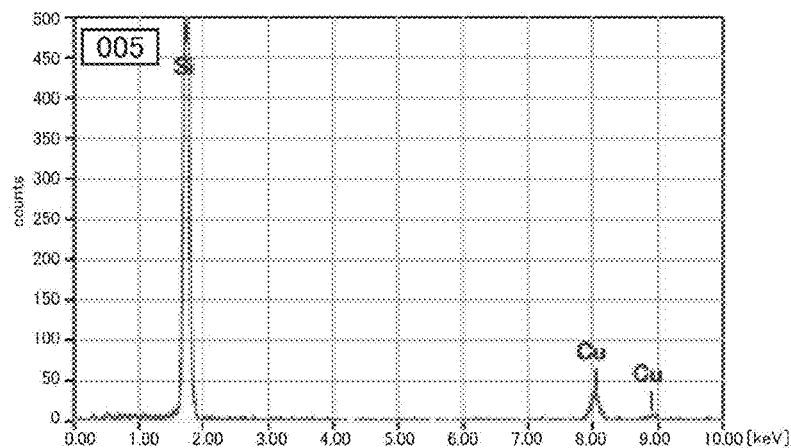

To Sample 3-4, STEM-HAADF observation and STEM/EDX mapping were performed. Note that when observed by STEM-HAADF, by excluding influences (strains and shifts in lattices, etc.) other than those due to composition, it is possible to observe only the change in composition and to obtain image having a bright-contrast approximately proportional to the square of the atomic number. FIG. 15A shows a STEM-HAADF image of Sample 3-4. FIGS. 15B and 15C each show a high-magnification image of a part of FIG. 15A. FIG. 16A shows a high-magnification image of a part of FIG. 15A; and FIGS. 16B, 16C, and 17A to 17C each show the corresponding EDX spectrum of the spots 001 to 005 shown in FIG. 16A.

As shown in FIG. 15A, in a low-magnification STEM-HAADF image, while only some small crystals of foreign materials were observed, no contrast in composition or the like was found. This result matches with the results of the XRD measurement and XPS measurement of Sample 3-4. Note that from the EDX spectra shown in FIGS. 16B, 16C, and 17A to 17C, it was confirmed that the crystals of foreign materials were those of NiSi and SiGe. It can be considered that these were formed in the regions where the concentrations of Ni and Ge were relatively high.

(Characterization of Conductivity (Conductivity Test))

The above-mentioned results of the experiments (disappearance of the peaks in XRD, which were not observed by XPS and TEM either) were considered as an evidence of the co-doped Ge and Ni; and if the Si was actually doped with Ni and Ge, it can be expected that the conductivity should have become higher. In this view, characterization of conductivity of each of the following Si powders after treatment (Samples 5-1 to 7-4) was performed.

(Characterization 1)

With respect to Samples 5-1 to 5-4 that were similar to Samples 1-2 to 1-5, characterization of conductivity, which will be described later, was performed. Note that the temperatures for the reducing heat treatment of Samples 5-1, 5-2, 5-3 and 5-4 respectively were 400° C., 600° C., 800° C. and 1000° C.

(Characterization 2)

With respect to the following Samples 6-1 to 6-4, characterization of conductivity, which will be described later, was performed.

(Sample 6-1)

A Si powder was put into a preparation solution, the preparation solution being prepared by dissolving Ge isopropoxide in IPA (isopropyl alcohol) as a solvent, in an atmospheric environment; followed by drying in a beaker or on a dish on a hotplate at 80° C. for 60 minutes. After that, Sn acetate was dissolved in ethylene glycol; followed by drying in a beaker or on a dish on a hotplate at 200° C. for 60 minutes, in a similar manner.

After drying, the resultant product was ground in a mortar, and was subjected to reducing heat treatment. The reducing heat treatment was performed under an atmosphere of a mixed gas of N$_2$ and H$_2$, at the conditions of 400° C. for 1 hour. Thus, a negative electrode active material of Sample 6-1 was obtained.

(Samples 6-2 to 6-4)

Negative electrode active materials of Samples 6-2 to 6-4 were obtained in the same manner as in Sample 6-1 except that the temperature conditions for the reducing heat treatment were 600° C. (Sample 6-2), 800° C. (Sample 6-3), and 1000° C. (Sample 6-4).

(Characterization 3)

With respect to Samples 7-1 to 7-4, characterization of conductivity, which will be described later, was performed.

(Samples 7-1 to 7-4)

Negative electrode active materials of Samples 7-1 to 7-4 were obtained in the same manner as in Samples 3-1 to 3-4. Note that the temperatures for the reducing heat treatment of Samples 7-1, 7-2, 7-3 and 7-4 respectively were 400° C., 600° C., 800° C. and 1000° C.

(Characterization 4)

(Sample 8-1)

A Si powder was put into a preparation solution, the preparation solution being prepared by dissolving Ge Ni acetate in ethylene glycol as a solvent; followed by drying in a beaker or on a dish on a hotplate at 200° C. for 60 minutes. After drying, the resultant product was ground in a mortar, and was subjected to reducing heat treatment at the conditions of 400° C. for 1 hour. Thus, a negative electrode active material of Sample 8-1 was obtained.

(Samples 8-2 to 8-4)

Negative electrode active materials of Samples 8-2 to 8-4 were obtained in the same manner as in Sample 8-1 except that the temperature conditions for the reducing heat treatment were 600° C. (Sample 8-2), 800° C. (Sample 8-3), and 1000° C. (Sample 8-4).

(Characterization of Conductivity)

Figure 18:
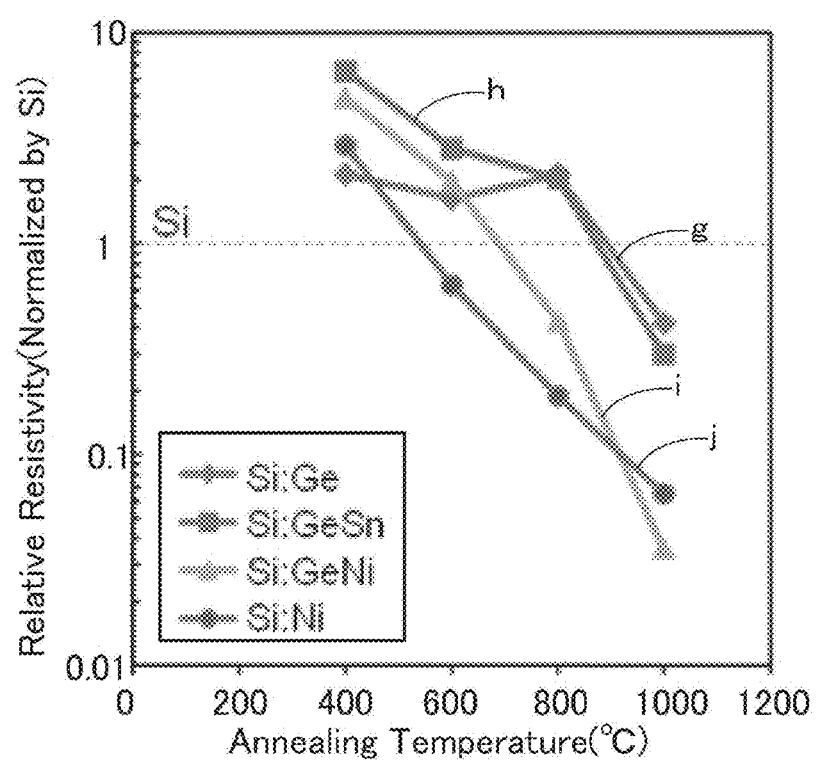
FIG. 18 is a graph showing a result of characterization of conductivity.

At the time of characterization of conductivity, etching by HNO$_3$/H$_2$O$_2$ immersion (removal of metal Ni) and HF/H$_2$O immersion (removal of oxides) was performed. Thus, the characterization of conductivity of the Si powder itself was performed. FIG. 18 shows a result of measurement (reducing temperature dependence of the conductivity, with the treatment for 1 hour). Note that in the characterization, the resistivity was normalized by the resistivity of untreated Si. In FIG. 18, the line g indicates the plotted measurement result of Samples 5-1 to 5-4; the line h indicates the plotted measurement result of Samples 6-1 to 6-4; the line i indicates the plotted measurement result of Samples 7-1 to 7-4; the line j indicates the plotted measurement result of Samples 8-1 to 8-4.

As shown in FIG. 18, the Si doped with Ni showed high conductivity after the treatment at 600° C. or more; and it was found that the diffusion of Ni also at relatively low temperatures. Further, the Si co-doped with Ni and Ge after the treatment at 1000° C. showed higher conductivity than that of the case of the Si doped with Ni. It can be considered that this was because an effect of Ge was obtained in addition to the effect of Ni-doping. These results match with the results of the above-mentioned XRD and XPS data; and they suggest that a material in which the Si was doped with Ge and Ni, and the Ge and Ni were diffused into the Si, was obtained.

(Half-Cells, Charge-Discharge Characteristics)
(Half-Cell 2-1)
(Preparation of Negative Electrode)

A negative electrode was prepared by using the previously prepared Si powder after the process of coating of Sample 2-1. The Si powder after the process of coating was mixed with PVdF, and the resultant mixture was dispersed in N-methyl-2-pyrrolidone as a solvent to provide negative electrode mixture slurry. Subsequently, the negative electrode mixture slurry was coated on a copper foil which was a negative electrode current collector, followed by drying. Then by being subjected to compression molding by a roll press or the like, the negative electrode in which the negative electrode active material layer was formed on the negative electrode current collector was obtained.

(Preparation of Half-Cell)

A half-cell (referred to as "half-cell 2-1") having the previously prepared negative electrode as a working electrode and a Li foil as a counter electrode was prepared. As an electrolytic solution, one which was similar to that of the half-cell 1-1 was prepared. A polyethylene microporous film was used as a separator.

(Half-Cell 2-2)
(Preparation of Negative Electrode Active Material)

After kneading a Si powder with a $B_2O_3$ powder, heat treatment was performed in a forming gas. At this time, since the $B_2O_3$ would be molten to liquid state at the melting point of 450° C., it would spontaneously coat the Si and cause solid-phase diffusion. Then, unreacted $B_2O_3$ was removed by dissolving to $H_2O$; and $SiO_2$ formed on the surface of the Si was removed by HF. Thus, a negative electrode active material in which the inside of Si was doped with B was obtained.

(Preparation of Half-Cell)

Next, a half-cell 2-2 was prepared in the same manner as in the half-cell 2-1.

(Characterization of Half-Cells)

Figure 19:
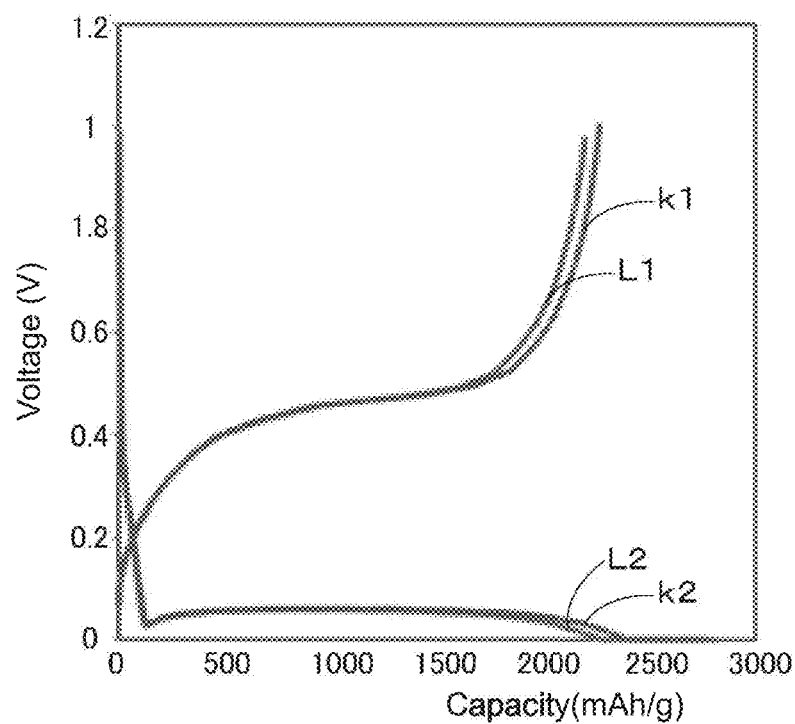
FIG. 19 is a charge-discharge graph of half-cells 2-1 and 2-2.

Characterization of the prepared half-cells was performed at an environmental temperature of 25° C., a potential range of 0.0 V to 1.0 V, and a current of 0.1 C. FIG. 19 shows charge-discharge characteristics of the half-cells 2-1 and 2-2. Note that 1 C corresponds to the current value to charge/discharge the theoretical capacity in 1 hour.

As shown in FIG. 19, it was confirmed that although the conductivity of each of the powders of the negative electrode active materials used in the half-cells 2-1 and 2-2 was 30-times higher than that of the untreated Si, the properties of capacity and initial efficiency were almost at the same level as those of Si.

5. Other Embodiments (Variation Examples)

The present disclosure is not limited to the above-described embodiments. It is understood that various changes and modifications may be made without departing from the gist of the present disclosure.

For example, the numerical values, the structures, the shapes, the materials, the raw materials, the production processes and the like in the foregoing embodiments and examples are merely mentioned for illustrative purpose, and different numerical values, structures, shapes, materials, raw materials, production processes and the like may be used as appropriate.

Moreover, the configurations, the methods, the processes, the shapes, the materials, the numerical values and the like in the foregoing embodiments may be combined with each other without departing from the gist of the present disclosure.

Having descried as the second embodiment above a battery with a cylinder-type battery structure, the battery having a spirally-wound structure in which the electrodes have been spirally wound, the batteries are not limited thereto. For example, an embodiment of the present disclosure may also be applied to batteries having other battery structures, for example: a laminated film-type battery in which a laminated film is used for its exterior; a stacked-type battery having a stacked structure of electrodes; a square battery; a coin battery; a flat battery; and a button battery. Examples of the stacked-type batteries include: those having a battery structure in which positive and negative electrodes are laminated interposed by sheet-like separators; those having a battery structure in which positive and negative electrodes are laminated, with one strip-like separator being folded in a zig-zag form interposed therebetween; and those having a battery structure in which positive and negative electrodes are laminated, with a pair of strip-like separators sandwiching a negative electrode and being folded in a zig-zag form, interposed therebetween. Incidentally, the electrolyte is not limited to the liquid electrolyte either.

The present disclosure can have the following configurations.

(1) A negative electrode active material comprising:
    a core particle comprising silicon; and
    at least one metal element selected from the group consisting of: Ge, Sn, Ni, Mo, W, Ag, Pd, Cu, Bi, Fe, Co, Mn, Cr, V, Ga, B, Sb, In, Te, Cd, Rh, Ru, Nb, Ta, Re, Os, Ir, Pt, Pb and P,
    wherein an elemental composition of the negative electrode active material varies continuously from a center of the core particle to a surface of the core particle.

(2) The negative electrode active material according to (1), wherein the silicon and the at least one metal element are diffused into each other.

(3) The negative electrode active material according to (1) or (2), wherein the at least one metal element is selected from the group consisting of Ge, Ni and Co.

(4) The negative electrode active material according to any one of (1) to (3), wherein a content of the at least one metal element is greater than 0 atomic percent and smaller than 1 atomic percent of silicon.

(5) The negative electrode active material according to any one of (1) to (4), wherein the core particle is a silicon particle or a $SiO_a$ particle, wherein $0<a<2$.

(6) The negative electrode active material according to any one of (1) to (5), wherein a compositional ratio of silicon gradually decreases from the center of the core particle to the surface of the core particle.
(7) The negative electrode active material according to any one of (1) to (6), wherein a compositional ratio of the metal element gradually increases from the center of the core particle to the surface of the core particle.
(8) The negative electrode active material according to any one of (1) to (7), wherein the at least one metal element comprises a second metal element and a third metal element, wherein the second metal element has an atomic radius of 109 percent or more of that of silicon, and wherein the third metal element has an atomic radius smaller than 109 percent of that of silicon.
(9) The negative electrode active material according to (8), wherein the second metal element and the third metal element are interdiffused with the silicon.
(10) A negative electrode comprising:
a current collector; and
the negative electrode active material according to any one of (1) to (9),
wherein the negative electrode active material is formed on at least one surface of the current collector.
(11) A battery comprising:
a positive electrode;
the negative electrode according to (10);
a separator formed therebetween; and
an electrolyte.
(12) An electric vehicle comprising:
an electricity driving force converter; and
the battery according to (11),
wherein the electricity driving force converter converts electricity from the battery into a driving force for the electric vehicle.
(13) An electric storage apparatus comprising the battery according to (11).
(14) An electronic apparatus comprising the battery according to (11).
(15) A power storage system comprising the battery according to (11).
(16) A negative electrode active material comprising:
a core particle comprising silicon; and
a coating comprising at least one metal element selected from the group consisting of: Ge, Sn, Ni, Mo, W, Ag, Pd, Cu, Bi, Fe, Co, Mn, Cr, V, Ga, B, Sb, In, Te, Cd, Rh, Ru, Nb, Ta, Re, Os, Ir, Pt, Pb and P,
wherein at least a part of the core particle forms a silicon oxide.
(17) The negative electrode active material according to (16), wherein the negative electrode active material has a multi-layer structure comprising a silicon layer, a silicon oxide layer and a layer containing the at least one metal element.
(18) The negative electrode active material according to (16) or (17), wherein the silicon and the at least one metal element are not interdiffused.
(19) The negative electrode active material according to any one of (16) to (18), wherein the coating comprises at least one of a reduced product of a metal oxide containing the at least one metal element and a reduced product of a metal hydroxide containing the at least one metal element.
(20) The negative electrode active material according to any one of (16) to (19), wherein the at least one of the reduced product of the metal oxide and the reduced product of the metal hydroxide is obtained by a reducing heat treatment based on an Ellingham diagram.
(21) A method of manufacturing a negative electrode active material, the method comprising:
forming a coating on at least a part of a surface of a core particle, the core particle comprising silicon; and
reducing the coating by performing a heat treatment,
wherein the coating comprises at least one of a metal oxide and a metal hydroxide comprising at least one metal element selected from the group consisting of: Ge, Sn, Ni, Mo, W, Ag, Pd, Cu, Bi, Fe, Co, Mn, Cr, V, Ga, B, Sb, In, Te, Cd, Rh, Ru, Nb, Ta, Re, Os, Ir, Pt, Pb and P.
(22) The method according to (21), wherein the heat treatment is performed at a temperature of less than 400° C.
(23) The method according to (21) or (22), wherein the heat treatment is performed at a temperature greater than or equal to 1000° C.
(24) The method according to any one of (21) to (23), wherein the coating is reduced using $H_2$.

Furthermore, the present disclosure can have the following configurations.

(1') A negative electrode active material, including:
a core particle containing Si;
at least one metal element selected from the group consisting of Ge, Sn, Ni, Mo, W, Ag, Pd, Cu, Bi, Fe, Co, Mn, Cr, V, Ga, B, Sb, In, Te, Cd, Rh, Ru, Nb, Ta, Re, Os, Ir, Pt, Pb and P; and
a compositional gradient structure having elemental composition varying in a continuous fashion from center of the core particle to surface of the core particle.
(2') The negative electrode active material according to (1'), in which
a compositional ratio of the Si in the compositional gradient structure is gradually decreased from the center to the surface of the core particle; and
a compositional ratio of the at least one metal element in the compositional gradient structure is gradually increased from the center to the surface of the core particle.
(3') The negative electrode active material according to (1') or (2'), in which
the at least one metal element is metal elements including the both of
a second metal element having an atomic radius of 109 percent or more of that of Si, and
a third metal element having an atomic radius smaller than 109 percent of that of Si.
(4') The negative electrode active material according to (3'), in which
the second metal element is selected from Ge, Sn, Mo, W, Ag, Pd, Bi, V, Ga, Sb, In, Te, Cd, Rh, Ru, Nb, Ta, Re, Os, Ir, Pt and Pb; and
the third metal element is selected from Ni, Cu, Fe, Co, Mn, Cr, B and P.
(5') The negative electrode active material according to any one of (1') to (4'), in which
a content of the at least one metal element is smaller than 1 atomic percent of the Si.
(6') The negative electrode active material according to (3') or (4'), in which
a content of the second metal element is smaller than 1 atomic percent of the Si; and
a content of the third metal element is smaller than 1 atomic percent of the Si.
(7') The negative electrode active material according to (3') or (6'), in which
a content of the third metal element is smaller than a content of the second metal element.
(8') The negative electrode active material according to any one of (1') to (7'), in which the at least one metal element is metal elements including two or more elements each of which is capable of forming a compound with Si, the elements being capable of forming a compound together.

(9') A negative electrode active material, including:
a core particle containing Si; and
a reduced product obtainable from reducing at least one oxide or hydroxide containing a metal element, the reduced product being contained in a thin film formed on at least a part of a surface of a Si particle being the core particle,
the reduced product being obtained by reduction with an element having smaller ΔG with respect to 1 mole of oxygen molecules in Ellingham diagram than ΔG of the metal element with respect to 1 mole of oxygen molecules in Ellingham diagram,
the metal element being at least one selected from the group consisting of Ge, Sn, Ni, Mo, W, Ag, Pd, Cu, Bi, Fe, Co, Mn, Cr, V, Ga, B, Sb, In, Te, Cd, Rh, Ru, Nb, Ta, Re, Os, Ir, Pt, Pb and P.

(10') The negative electrode active material according to (9'), in which
the thin film is formed by sol-gel hydrolysis process.

(11') The negative electrode active material according to (9') or (10'), in which
the reduction is performed under an atmosphere of nitrogen, argon, hydrogen, or a mixed gas of at least two of nitrogen, argon and hydrogen.

(12') The negative electrode active material according to any one of (9') to (11'), in which
the reduced product is a metal element obtainable from reducing the at least one oxide or hydroxide containing the metal element,
a temperature at which the reduction has been performed is within a temperature range where interdiffusion occurs between the metal element and the Si, and
the metal element is diffused into the core particle containing the Si.

(13-1') A battery, including:
a positive electrode; and
a negative electrode having a negative electrode active material including
a core particle containing Si,
at least one metal element selected from the group consisting of Ge, Sn, Ni, Mo, W, Ag, Pd, Cu, Bi, Fe, Co, Mn, Cr, V, Ga, B, Sb, In, Te, Cd, Rh, Ru, Nb, Ta, Re, Os, Ir, Pt, Pb and P, and
a compositional gradient structure having elemental composition varying in a continuous fashion from center of the core particle to surface of the core particle.

(13-2') A battery, including:
a positive electrode; and
a negative electrode having a negative electrode active material including
a core particle containing Si, and
a reduced product obtainable from reducing at least one oxide or hydroxide containing a metal element, the reduced product being contained in a thin film formed on at least a part of a surface of a Si particle being the core particle,
the reduced product being obtained by reduction with an element having smaller ΔG with respect to 1 mole of oxygen molecules in Ellingham diagram than ΔG of the metal element with respect to 1 mole of oxygen molecules in Ellingham diagram,
the metal element being at least one selected from the group consisting of Ge, Sn, Ni, Mo, W, Ag, Pd, Cu, Bi, Fe, Co, Mn, Cr, V, Ga, B, Sb, In, Te, Cd, Rh, Ru, Nb, Ta, Re, Os, Ir, Pt, Pb and P.

(14') A battery pack, including:
the battery according to (13-1') or (13-2');
a control unit configured to control the battery; and
an exterior configured to contain the battery.

(15') An electronic apparatus, including:
the battery according to (13-1') or (13-2'),
the electronic apparatus being configured to receive electricity supply from the battery.

(16') An electric vehicle, including:
the battery according to (13-1') or (13-2');
a converter configured to
receive electricity supply from the battery and
convert the electricity into driving force for vehicle; and
a controller configured to process information on vehicle control on the basis of information on the battery.

(17') An electrical storage apparatus, including:
the battery according to (13-1') or (13-2'),
the electrical storage apparatus being configured to provide electricity to an electronic apparatus connected to the battery.

(18') The electrical storage apparatus according to (17'), further including:
an electricity information controlling device configured to transmit and receive signals via a network to and from other apparatus,
the electrical storage apparatus being configured to control charge and discharge of the battery on the basis of information that the electricity information controlling device receives.

(19') An electricity system, configured to
receive electricity supply from the battery according to (13-1') or (13-2'); or
provide electricity from at least one of a power generating device and a power network to the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A negative electrode active material comprising:
a core particle comprising silicon; and
a coating on at least a part of a surface of the core particle, the coating comprising at least one of a metal oxide and a metal hydroxide comprising at least one metal element selected from the group consisting of: B, Te, and P,
wherein an elemental composition of the negative electrode active material varies continuously from a center of the core particle to a surface of the core particle.

2. The negative electrode active material according to claim 1, wherein the silicon and the at least one metal element are diffused into each other.

3. The negative electrode active material according to claim 1, wherein a content of the at least one metal element is greater than 0 atomic percent and smaller than 1 atomic percent of silicon.

4. The negative electrode active material according to claim 1, wherein the core particle is a silicon particle or a SiOa particle, wherein 0<a<2.

5. The negative electrode active material according to claim 1, wherein a compositional ratio of silicon gradually decreases from the center of the core particle to the surface of the core particle.

6. The negative electrode active material according to claim 1, wherein a compositional ratio of the metal element gradually increases from the center of the core particle to the surface of the core particle.

7. The negative electrode active material according to claim 1, wherein the at least one metal element comprises a second metal element and a third metal element, wherein the second metal element has an atomic radius of silicon, and wherein the third metal element has an atomic radius smaller than 109 percent of that of silicon.

8. The negative electrode active material according to claim 7, wherein the second metal element and the third metal element are interdiffused with the silicon.

9. A negative electrode comprising:
a current collector; and
the negative electrode active material according to claim 1,
wherein the negative electrode active material is formed on at least one surface of the current collector.

10. A battery comprising:
a positive electrode;
the negative electrode according to claim 9;
a separator formed therebetween; and
an electrolyte.

11. An electric vehicle comprising:
an electricity driving force converter; and
the battery according to claim 10,
wherein the electricity driving force converter converts electricity from the battery into a driving force for the electric vehicle.

12. An electric storage apparatus comprising the battery according to claim 10.

13. An electronic apparatus comprising the battery according to claim 10.

14. A power storage system comprising the battery according to claim 10.

15. A negative electrode active material comprising:
a core particle comprising silicon; and
a coating on at least a part of a surface of the core particle, the coating comprising at least one of a metal oxide and a metal hydroxide comprising at least one metal element selected from the group consisting of B, Te, and P,
wherein an elemental composition of the negative electrode active material varies continuously from a center of the core particle to a surface of the core particle, and the core particle comprises a SiOa particle, wherein 0<a<2.

* * * * *